US012803162B2

(12) United States Patent
Chou et al.

(10) Patent No.: US 12,803,162 B2
(45) Date of Patent: Nov. 17, 2026

(54) ANTENNA DEVICE WITH SWINGING MECHANISM

(71) Applicant: Strong-Wave Radio Technology Inc., Taoyuan City (TW)

(72) Inventors: Hsi Tseng Chou, Taoyuan City (TW); Zhi Da Yan, Taoyuan City (TW); Chien Hsin An, Taoyuan City (TW); Siddhartha Panigrahi, Taoyuan City (TW)

(73) Assignee: Strong-Wave Radio Technology Inc., Taoyuan City (TW)

( * ) Notice: Subject to any disclaimer, the term of this patent is extended or adjusted under 35 U.S.C. 154(b) by 34 days.

(21) Appl. No.: 18/773,624

(22) Filed: Jul. 16, 2024

(65) Prior Publication Data

US 2025/0038405 A1 Jan. 30, 2025

Related U.S. Application Data

(60) Provisional application No. 63/529,356, filed on Jul. 27, 2023.

(30) Foreign Application Priority Data

Dec. 20, 2023 (TW) ................................ 112149840

(51) Int. Cl.
*H01Q 3/14* (2006.01)
*H01Q 15/02* (2006.01)
*H04B 1/40* (2015.01)

(52) U.S. Cl.
CPC ............... *H01Q 3/14* (2013.01); *H01Q 15/02* (2013.01); *H04B 1/40* (2013.01)

(58) Field of Classification Search
CPC ............ H01Q 3/14; H01Q 15/02; H01Q 3/26; H01Q 3/08; H01Q 3/06; H01Q 15/08;
(Continued)

(56) References Cited

U.S. PATENT DOCUMENTS 2,552,566 A * 5/1951 Levine ..................... H01Q 3/08 343/765
3,141,168 A * 7/1964 Lowell ..................... H01Q 3/08 343/915
(Continued)

FOREIGN PATENT DOCUMENTS

CN 102751585 A 10/2012
EP 3242358 A1 11/2017
(Continued)

OTHER PUBLICATIONS

European Patent Office, "European Search Report and Search Opinion on European Patent Application No. EP24189018.5", Dec. 16, 2024, 16 pages, European Patent Office, Munich, Germany.

*Primary Examiner* — Dameon E Levi
*Assistant Examiner* — Jordan E. DeWitt

(57) ABSTRACT

An antenna device with a swinging mechanism includes at least one antenna module, at least one active radio-frequency module, and at least one swinging portion. The antenna module can transmit at least one active radio-frequency signal outward and receive at least one external RF signal from the outside. The active radio-frequency module can be electrically connected to the antenna module and control the phase and amplitude of the active RF signal so that the antenna module can form a focused radiation beam of the active RF signal and control the generation of a radiation pattern by the antenna module for receiving the external RF signal. The swinging portion is connected to the antenna module and can swing the antenna module along a circular arc around a center of circle defined by a central support point to supplement an ability of the antenna module in scanning in a one-dimensional direction.

19 Claims, 20 Drawing Sheets

(58) Field of Classification Search
CPC ...... H01Q 19/062; H01Q 25/007; H01Q 3/02; H01Q 1/12; H01Q 19/06; H04B 1/40
See application file for complete search history.

(56) References Cited

U.S. PATENT DOCUMENTS

| | | | | | |
|---|---|---|---|---|---|
| 3,464,116 | A * | 9/1969 | Kissell | B64G 3/00 | 33/276 |
| 4,821,047 | A * | 4/1989 | Williams | H01Q 3/08 | 343/765 |
| 7,525,504 | B1 * | 4/2009 | Song | H01Q 25/005 | 343/860 |
| 2002/0011958 | A1 * | 1/2002 | Ogawa | H01Q 25/00 | 343/763 |
| 2005/0146473 | A1 * | 7/2005 | Stoyanov | H01Q 1/3275 | 343/753 |
| 2010/0026607 | A1 * | 2/2010 | Imai | G01S 7/03 | 343/753 |
| 2010/0259458 | A1 * | 10/2010 | Mattis | H01Q 3/08 | 343/766 |
| 2019/0280373 | A1 * | 9/2019 | Adada | H01Q 1/34 | |
| 2019/0393598 | A1 * | 12/2019 | Logothetis | H01Q 3/08 | |
| 2025/0038402 | A1 * | 1/2025 | Chou | H01Q 19/062 | |
| 2025/0038405 | A1 * | 1/2025 | Chou | H01Q 3/26 | |
| 2026/0039015 | A1 * | 2/2026 | Chiu | H01Q 3/06 | |

FOREIGN PATENT DOCUMENTS

| | | | |
|---|---|---|---|
| JP | H12-2000295029 | A | 10/2000 |
| TW | 200501505 | A | 1/2005 |

* cited by examiner

ANTENNA DEVICE WITH SWINGING MECHANISM

CROSS-REFERENCE TO RELATED PATENT APPLICATION

This application claims the benefit of U.S. Provisional Application No. 63/529,356, filed Jul. 27, 2023; and claims priority to and the benefit of, under 35 U.S.C. § 119(a), Taiwan Patent Application No. 112149840, filed Dec. 20, 2023 in Taiwan. The entire content of the above identified applications is incorporated herein by reference.

FIELD

The present disclosure relates to an antenna device, and more particularly to an antenna device with a swinging mechanism to drive one or more antenna modules to perform circular arc swinging to track one or more satellites.

BACKGROUND

If the Earth stood still, all the artificial satellites (hereinafter referred to as satellites for short) would be moving in practically coplanar circular or elliptical orbits to satisfy the laws of motion, or more particularly to achieve balance between centripetal forces and centrifugal forces. This orbit plane is symmetric with respect to the equatorial plane of the Earth and may rotate from the Antarctic side toward the Arctic side either counterclockwise or clockwise. In each orbit, there are a plurality of satellites that sequentially revolve around the Earth and that, in the optimal condition, are distributed at equal intervals along the orbit, i.e., are equally angularly spaced along a 360-degree path.

In order to maintain a communication link with chosen satellites, a ground antenna system must have a directive beam that tracks the location of the satellites at any time. When a communicating satellite has passed above the ground antenna system and is at a position where its signal strength becomes insufficient or goes below the horizon and loses its visual-range linear connection with the ground antenna system, the ground antenna system is required to be able to move rapidly from a satellite it originally linked to but is about to lose connection therewith to another linkable satellite and continue tracking its movement. Such crossover linking and forward tracking action is critical to ensuring a sustained communication link. The existing tracking methods of antennas use a motor-driven pan head for rotation, as is typically the case with dish antennas. The pan head has at least two motor-driven rotation shafts, respectively tracking the satellite movement on the same orbit plane. While such methods advantageously feature a lower cost, structural simplicity, relatively few issues with heat dissipation, and technical maturity, etc., they have slow mechanical scanning and can only track a single satellite, and when the tracked satellite has insufficient signal strength so the communication thereto needs to be cut off to relink to another satellite, the directive position of the ground antenna system relies on the original pan-head motor structure to return to the position corresponding to where another satellite appears so as to reestablish linking. Such mechanical-rotation position return is very time-consuming, and communication may be cut off as a result, not to mention the large amount of space required and that the cost is still not low enough. Moreover, mechanical scanning has limited scanning directions and does not allow the beam position to be restored rapidly. Therefore, when it comes to low-Earth-orbit (LEO) satellites, the demand for which has increased significantly in recent years, it is obvious that the foregoing tracking methods leave much to be desired.

Unlike the aforesaid tracking technique that relies entirely on mechanical movement, the active array antenna technique provides a solution to rapid beam tracking. Such an array antenna includes a large number of antenna units, with a radio-frequency (RF) module provided at the back end of each antenna unit. An active array antenna uses an electronic beam-forming mechanism that allows the beam direction to be changed at an extremely high speed, or within a time on the order of milliseconds, which makes it suitable to track LEO satellites with an active array antenna. This technique, however, is disadvantaged by its circuit complexity, a high cost, the required use of a multi-layer substrate, the high complexity of system control and of the manufacturing process, and so on. One of the issues to be addressed in the present disclosure is to provide a desirable antenna structure that can solve the aforementioned problems effectively.

SUMMARY

As there is still room for improvement for current antenna device in tracking satellites, to stand out in a competitive market, based on years of practical experience in professional antenna design and the research sprit striving for excellence, and as a result of longtime research and experiments, an antenna device with a swinging mechanism is provided in the present disclosure, which provides users with better user experience.

Certain aspects of the present disclosure are directed to an antenna device with a swinging mechanism. The antenna device includes at least one antenna module, at least one active RF module and at least one swinging portion. The at least one antenna module can transmit at least one active RF signal outward and receive at least one external RF signal from the outside. The at least one active RF module is electrically connected to the at least one antenna module and can control a phase and an amplitude of the at least one active RF signal transmitted from the at least one antenna module so that the at least one antenna module forms a focused radiation beam of the at least one active RF signal, and control the generation by the at least one antenna module of a radiation pattern for receiving the at least one external RF signal. The at least one swinging portion is connected to the at least one antenna module and can swing the at least one antenna module along a circular arc around a center of circle defined by a central support point to supplement an ability of the at least one antenna module in scanning in a one-dimensional direction.

In certain embodiments, the antenna device further includes a rotating portion that is connected to the at least one swinging portion and can drive the at least one swinging portion to rotate such that the at least one antenna module spins on or revolves around a vertical axis to supplement an ability of the at least one antenna module in scanning another dimensional direction. The vertical axis crosses an extension line of the central support point.

In certain embodiments, the rotating portion can make the at least one antenna module rotate in a single direction that is clockwise or counterclockwise, or in alternating clockwise and counterclockwise directions.

In certain embodiments, the central support point is located forward of the at least one antenna module and facing a radiation plane of the at least one antenna module.

In certain embodiments, the central support point is located behind the at least one antenna module and facing away from a radiation plane of the at least one antenna module.

In certain embodiments, the antenna device further includes at least one lens mechanism, an extension line of the central support point extends through a portion of the at least one lens mechanism, the at least one antenna module can be swung along a circular arc around a periphery of the at least one lens mechanism, and the at least one lens mechanism can receive the radiation beam transmitted from the at least one antenna module, generate a corresponding secondary beam, and emit the secondary beam from a side of the at least one lens mechanism that is opposite to the at least one antenna module.

In certain embodiments, the at least one lens mechanism has a substantially cylindrical shape.

In certain embodiments, the at least one lens mechanism includes a plurality of lens disks connected in series along an axial direction.

In certain embodiments, the at least one lens mechanism has a substantially semicylindrical shape and a cut-off surface at one side of the at least one lens mechanism, and a swinging area of the at least one antenna module is substantially on a side of the at least one lens mechanism that faces away from the cut-off surface.

In certain embodiments, the at least one lens mechanism has a substantially spherical shape.

In certain embodiments, the at least one antenna module includes two antenna modules, the at least one swinging portion includes two swinging portions, each of the two antenna modules can be swung by a corresponding one of the two swinging portions, and the swinging directions of the two antenna modules are the same.

In certain embodiments, the at least one antenna module includes two antenna modules, the at least one swinging portion includes two swinging portions, each of the two antenna modules can be swung by a corresponding one of the two swinging portions, and the swinging directions of the two antenna modules are opposite.

In certain embodiments, a swinging angle of the at least one antenna module is between 0 and 90 degrees.

In certain embodiments, the at least one antenna module includes two antenna modules, the antenna modules are arranged in a first axial direction and can be swung in a second axial direction.

In certain embodiments, the at least one antenna module includes two antenna modules, the antenna modules are arranged in a first axial direction and can be swung in the first axial direction.

In certain embodiments, each of the at least one antenna module includes a plurality of antenna unit groups arranged in a first direction, each of the plurality of antenna unit groups includes at least one antenna unit arranged in a second direction, each of the antenna unit groups is electrically connected to a corresponding one of the at least one active RF module, the corresponding active RF module can control the phase and amplitude of at least one RF signal corresponding to the antenna unit group.

In certain embodiments, each of the at least one active RF module includes a transmitting-end beam-forming integrated circuit (BFIC), a power amplifier, a low-noise amplifier and a receiving-end BFIC. The transmitting-end BFIC can control the antenna unit groups to generate the focused radiation beam of the at least one active RF signal. The power amplifier is electrically connected to the transmitting-end BFIC and can receive the at least one active RF signal from the transmitting-end BFIC, amplify a power of the at least one active RF signal received from the transmitting-end BFIC, and directly or indirectly transmit the amplified at least one active RF signal to the antenna unit groups. The receiving-end BFIC can control the generation by the antenna unit groups of the radiation pattern for receiving the at least one external RF signal. The low-noise amplifier is electrically connected to the receiving-end BFIC and can directly or indirectly receive the at least one external RF signal and amplify the at least one external RF signal.

This and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
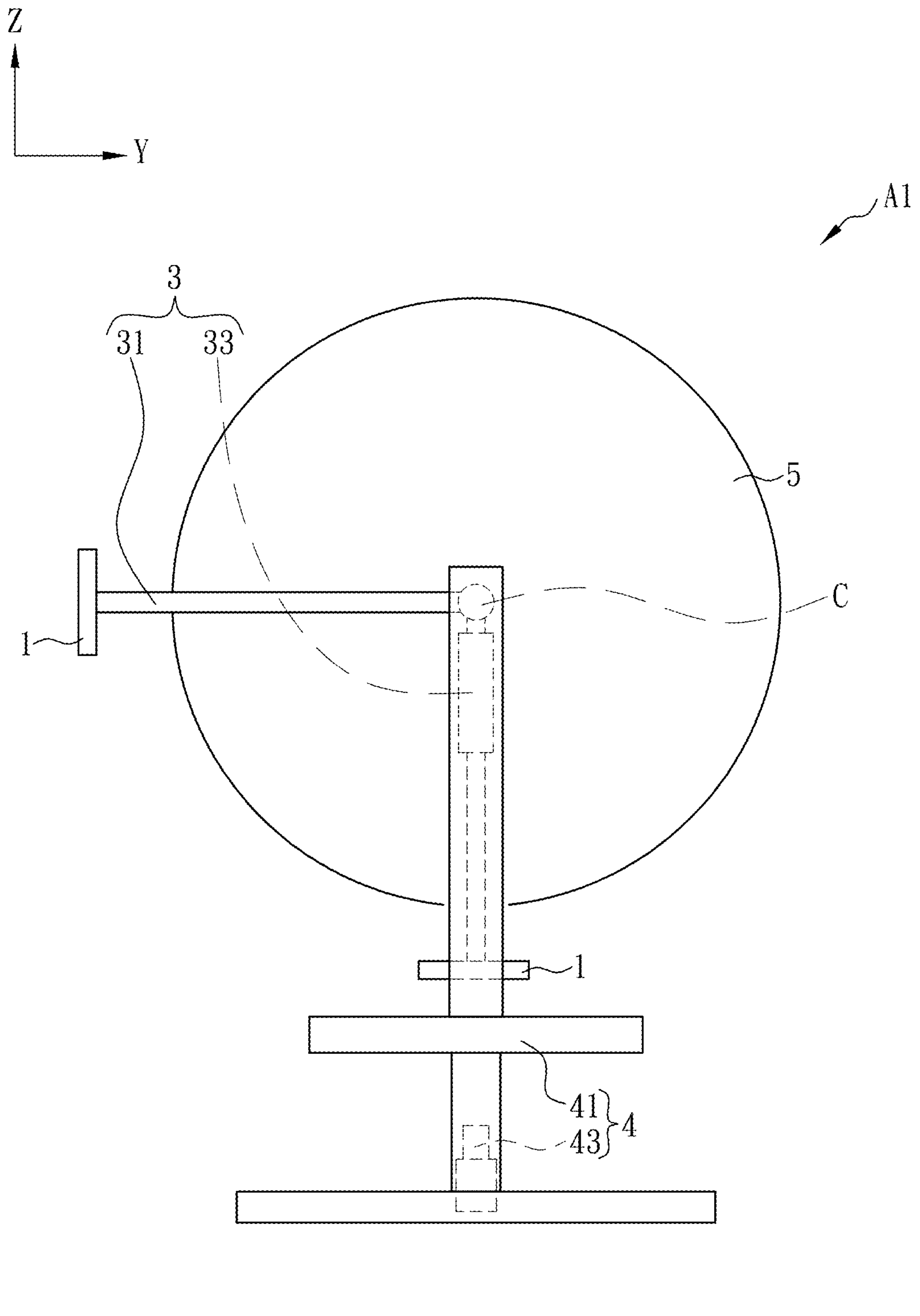
FIG. 1 is a side view of an antenna device according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the term "and/or" includes any and all combinations of one or more of the associated listed items. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As used herein, a numeral value referred in the present disclosure can include a value, or an average of values, in an acceptable deviation range of a particular value recognized or decided by a person of ordinary skill in the art, taking into account any specific quantity of errors related to the measurement of the value that may resulted from limitations of a measurement system or device. For example, a particular numeral value referred in the embodiments of the present disclosure can include ±5%, ±3%, ±1%, 0.5% or ±0.1%, or one or more standard deviations, of the particular numeral value.

The term "connected" or "electrically connected" as may be referred to in the present disclosure includes connection configurations such as direct connection between two components, indirection connection between two components with at least one component being provided between the two components, etc.

Certain aspects of the present disclosure are directed to an antenna device that has a swinging mechanism. To facilitate description, the spatial configuration as used in the present disclosure is defined by three axes that are perpendicular to one another, namely a transverse axis (the X axis), a longitudinal axis (the Y axis), and a vertical axis (the Z axis). Each of the axes, however, is not intended to refer specifically to a fixed direction. For example, the transverse axis may be an axis that extends in the leftward-rightward direction, an axis that extends in the forward-rearward direction, or an axis that extends in the upward-downward direction. The same is true of the longitudinal axis and the vertical axis. An antenna device in the present disclosure is capable of both electronic scanning (electronic tracking) and mechanical scanning (mechanical tracking) in order to achieve a mechanism for tracking satellites (e.g., LEO satellites). For instance, the antenna device can perform electronic scanning in one dimension (e.g., a dimension defined by the polar angle theta (θ)) so as to carry out rapid tracking and rapid beam position restoration, and mechanical scanning in another dimension (e.g., a dimension defined by the azimuthal angle phi (φ)) so as to establish a communication link to a satellite by tracking it at a lower speed. In certain embodiments, the antenna device can perform mechanical scanning (mechanical tracking) in a plane defined by sweeping through a polar angle and in a plane defined by sweeping through an azimuthal angle by only mechanical operation.

In certain embodiments, referring to FIG. 1 to FIG. 4, an antenna device A1 includes two antenna modules 1, a plurality of active RF modules 2, two swinging portions 3, a rotating portion 4, and a lens mechanism 5. The antenna modules 1 are capable of electronic scanning and are each in the form of an array antenna. An array antenna having a one-dimensional layout can perform electronic scanning in a plane defined by sweeping through a polar angle (theta, or θ), and an array antenna having a two-dimensional layout can perform electronic scanning in a plane defined by sweeping through an azimuthal angle (phi, or φ) as well as in a plane defined by sweeping through a polar angle. As the minimum requirement for electronic scanning (i.e., scanning in a single dimension) can be met by a one-dimensional array antenna, each antenna module 1 can be constructed into a one-dimensional array antenna by using a plurality of high-gain antenna objects in order to carry out beam scanning in a single dimension. However, the present disclosure is not limited thereto. In certain embodiments, one or more antenna modules 1 can be in an antenna form other than one or more array antennas and can do without the electronic scanning capacity, as long as the antenna module(s) 1 can generate focused beams in predetermined directions.

Referring to FIG. 1 to FIG. 4, an antenna module 1 includes a plurality of antenna unit groups 11 (e.g., M antenna unit groups 11). The antenna unit groups 11 are configured to transmit RF signals outward and to receive external RF signals from the outside. The antenna unit groups 11 are arranged substantially along a first direction (e.g., the X-axis direction in FIG. 3), and each antenna unit group 11 includes a plurality of antenna units 111 (e.g., N antenna units 111) that are arranged substantially along a second direction (e.g., the Y-axis direction in FIG. 3). In other words, the arranging direction of the antenna unit groups 11 is different from the arranging direction of the antenna units 111. In certain embodiments, however, an antenna unit group 11 can include only one antenna unit 111 (i.e., N=1). Each antenna unit group 11 can be electrically connected to an active RF module 2 to receive the active RF signal transmitted from the active RF module 2 and form the corresponding radiation beam, or to transmit the received external RF signals to the corresponding active RF module 2.

Figure 3:
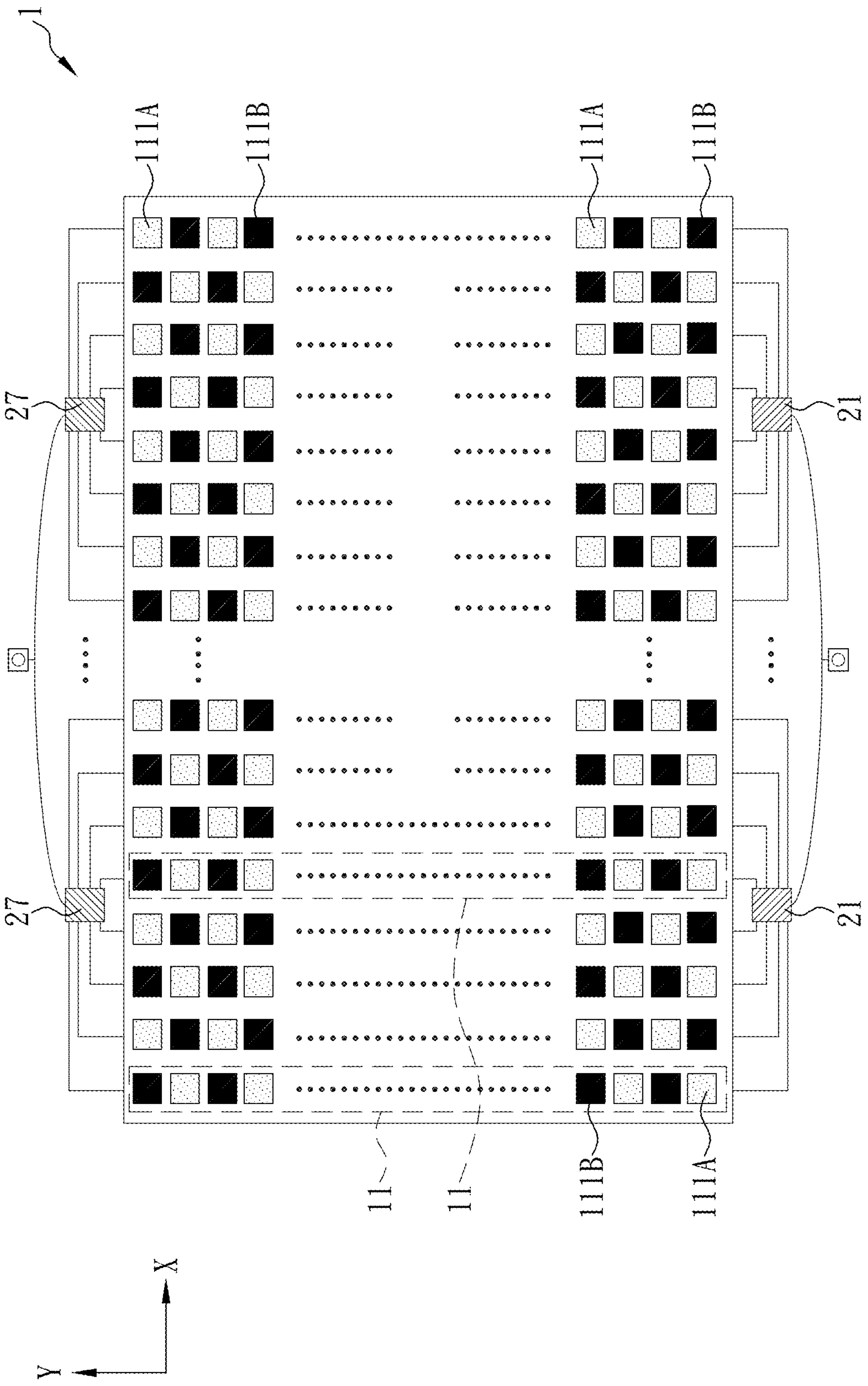
FIG. 3 is a schematic diagram of the antenna unit configuration of an antenna module according to certain embodiments of the present disclosure.
Figure 4:
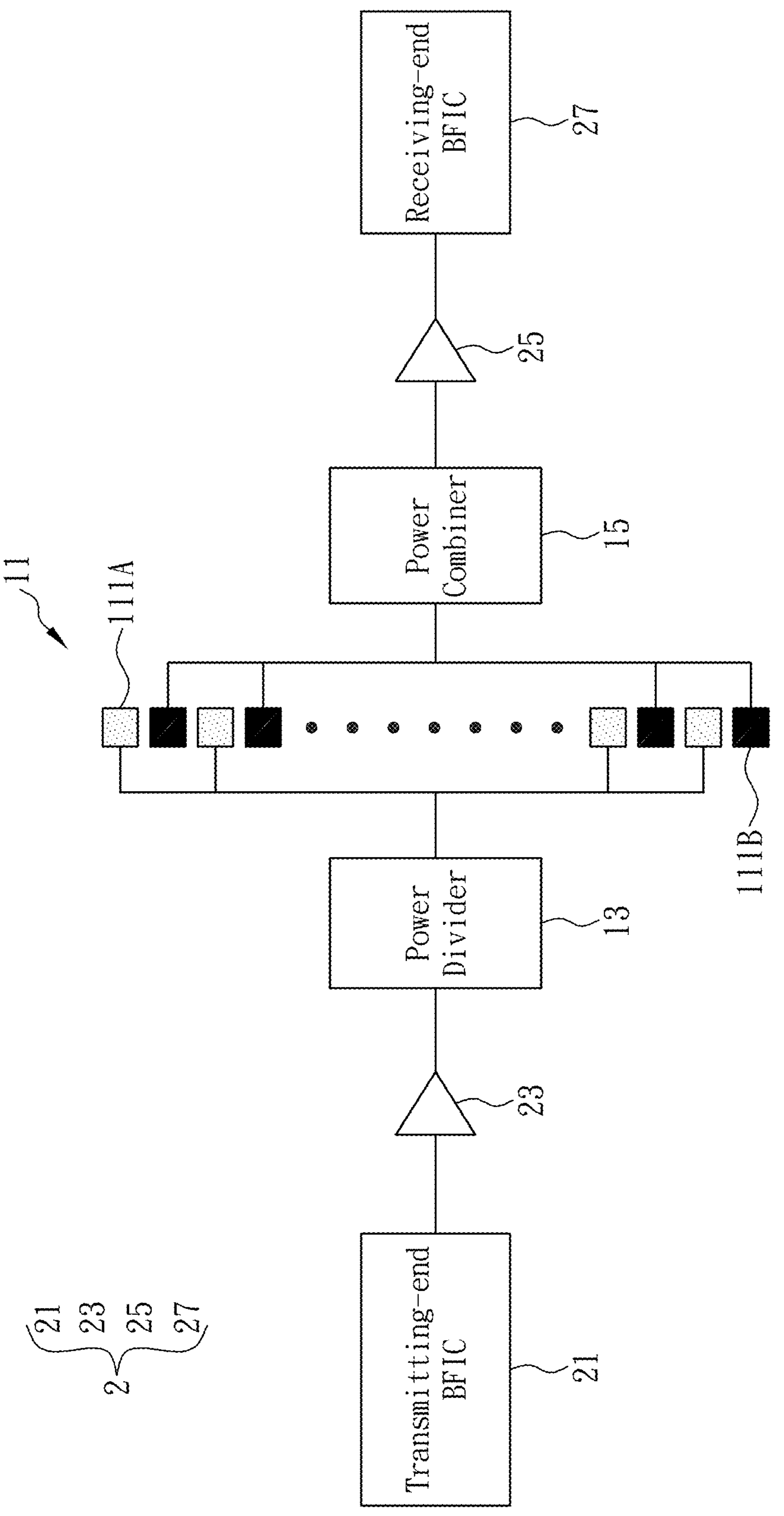
FIG. 4 is a block diagram of the circuitry of an antenna module and an active RF module according to certain embodiments of the present disclosure.

It should be pointed out that each active RF module 2 is mainly a BFIC for controlling the phase and amplitude of the active RF signal at the corresponding antenna element of an array antenna and thereby forming a radiation pattern in a particular direction. Accordingly, FIG. 3 presents the configuration of the antenna unit groups 11 being electrically connected to a plurality of BFICs (which include transmitting-end BFICs 21 and receiving-end BFICs 27), and certain electronic elements are left out in the drawing for brevity. Depending on actual product requirements (e.g., the requirement for full-duplex operations, or considerations of cost or space), the same BFIC can serve both transmitting and receiving purposes without utilizing BFICs designed specifically for transmitting purposes or receiving purposes. In other words, in certain embodiments, each antenna unit group 11 can be connected to a single BFIC rather than to a transmitting-end BFIC 21 and a receiving-end BFIC 27.

Referring to FIG. 1 to FIG. 4, when each antenna unit group 11 has a plurality of antenna units 111, each antenna unit group 11 can be provided with a power divider 13 for distributing an active RF signal evenly among the antenna units 111 and a power combiner 15 for combining the external RF signals received by the antenna units 111. In certain embodiments, each antenna unit group 11 is subjected to passive power distribution by the corresponding power divider 13 in order to form a radiation beam focused in a particular direction (e.g., the front-view (broadside) direction), with the radiation beam having a fan shape, i.e., with the radiation beam having a wide-beam configuration in the first direction (i.e., the direction in which the antenna unit groups 11 are sequentially arranged) and a narrow-beam configuration in the second direction (i.e., the direction in which the antenna units 111 are sequentially arranged), so as to increase the antenna gain.

Referring again to FIG. 1 to FIG. 4, each antenna unit group 11 works with one active RF module 2 and therefore can be viewed as a single antenna element (also referred to as an array element or a subarray) whose performance is equivalent to that of a high-gain antenna object. In other words, although the antenna units 111 of the antenna module 1 are physically arranged in a two-dimensional configuration, the antenna module 1 can be regarded function-wise as having a one-dimensional layout (i.e., with a plurality of high-gain antenna objects arranged one-dimensionally), and this one-dimensional layout enables electronic scanning in a plane defined by sweeping through a polar angle. When the antenna unit groups 11 are arranged on the top side of a circuit board (equivalent to the radiation surface of the antenna module 1) and face upward (e.g., in the Z-axis direction in FIG. 2), the electronic scanning angle of the antenna unit groups 11 in a plane defined by sweeping through a polar angle is in the range of, for example but not limited to, about ±50-60 degrees (with the Z axis indicating 0 degree). However, the present disclosure is note limited thereto, and the aforesaid scanning angle of the antenna module 1 can be increased to ±75 degrees by increasing the number of the antenna units 111.

In certain embodiments, with continued reference to FIG. 1 to FIG. 4, each antenna units 111 in the same antenna unit group 11 can be a transmitting-end antenna unit 111A or a receiving-end antenna unit 111B, depending on whether the antenna unit is electrically connected to a transmitting-end BFIC 21 or a receiving-end BFIC 27, and the transmitting-end antenna unit(s) 111A and the receiving-end antenna unit(s) 111B are alternately arranged. However, the present disclosure is not limited thereto. In certain embodiments, an antenna unit group 11 can include entirely the transmitting-end antenna unit(s) 111A and no receiving-end antenna unit 111B, or include entirely the receiving-end antenna unit(s) 111B and no transmitting-end antenna unit 111A, or an antenna unit group 11 can have a portion composed entirely of transmitting-end antenna units 111A and another portion composed entirely of receiving-end antenna units 111B, or an antenna unit 111 can be configured for both transmitting and receiving purposes, i.e., an antenna unit 111 that can serve as a receiving-end antenna unit 111B as well as a transmitting-end antenna unit 111A.

The antenna module 1 and the active RF modules 2 in the present disclosure are so designed that the antenna unit groups 11 can form narrower narrow beams. This helps increase the gain of the antenna module 1 so that a desirable range of coverage in a plane defined by sweeping through a polar angle can be attained with an increase in intensity of the received/transmitted RF signals. Besides, although the antenna device A1 in the present disclosure can scan in a plane defined by sweeping through an azimuthal angle by a mechanical mechanism (for example, the rotating portion 4 as described infra), the antenna module 1 in the disclosure can, in certain application scenarios or in response to certain application requirements (e.g., when the mechanical mechanism malfunctions or when it is required to switch between satellites rapidly or to reduce the movement of the mechanical mechanism), carry out additional (or temporary) electronic scanning in a plane defined by sweeping through an azimuthal angle (e.g., by working with one or more additional phase controllers or other devices, additional software, and so on), thereby increasing the flexibility of use.

The structure of each active RF module 2 is described infra but is not limited thereto. Depending on actual product requirements, the electronic components of each active RF module 2 or even the connections between the electronic components can be adjusted and changed, as long as the active RF module 2 can enable the antenna module 1 to generate the desired radiation beam(s) in a specified direction for transmitting the active RF signal(s) and desired radiation pattern for receiving the external RF signal(s). Referring to FIG. 1 to FIG. 4, in certain embodiments, each active RF module 2 includes a transmitting-end BFIC 21, a power amplifier 23, a low-noise amplifier 25, and a receiving-end BFIC 27, wherein the transmitting-end BFIC 21 has a main function of controlling and adjusting the phase and amplitude of the active RF signal transmitted by the corresponding antenna unit group(s) 11 so that the antenna module 1 can form a radiation beam in the specified direction. The transmitting-end BFIC 21 can receive an active RF signal from a RF signal source (for example, a RF signal formed through an up converter), and transmit it directly or indirectly to the corresponding antenna unit group(s) 11. In certain embodiments, each active RF module 2 has an independent transmitting-end BFIC 21. In certain embodiments, a plurality of active RF modules 2 can share one transmitting-end BFIC 21 that can provide each of the corresponding antenna unit groups 11 with its corresponding active RF signal.

With continued reference to FIG. 1 to FIG. 4, the power amplifier 23 can be electrically connected to the transmitting-end BFIC 21 in order to receive the active RF signal transmitted by the transmitting-end BFIC 21 and amplify the power of the active RF signal received. In addition, the power amplifier 23 can directly or indirectly transmit the amplified active RF signal to the antenna unit group 11. For example, the power amplifier 23 can transmit the amplified active RF signal to the power divider 13, and the power divider 13 divides the amplified active RF signal into a plurality of divided active RF signals and transmits the divided active RF signals to the antenna units 111, in particular the transmitting-end antenna units 111A, in the same antenna unit group 11 in order for the antenna unit group 11 to form a predetermined radiation beam.

With continued reference to FIG. 1 to FIG. 4, the low-noise amplifier 25 can be electrically connected to the antenna unit group 11 in order to receive, directly or indirectly, the external RF signal(s) transmitted by the antenna unit group 11. For example, when the antenna unit group 11 receives external RF signals, the antenna units 111 (in particular the receiving-end antenna units 111B) of the antenna unit group 11 transmit the external RF signals to the power combiner 15, in order for the power combiner 15 to combine the external RF signals into a combined external RF signal and transmit the combined external RF signal to the low-noise amplifier 25, which in turn amplifies the combined external RF signal to a power level sufficiently high without causing a significant increase in noise of the external RF signal, so as to increase the signal-to-noise ratio. The receiving-end BFIC 27 can be electrically connected to the low-noise amplifier 25 and is configured to receive the amplified external RF signal and perform relevant processing procedures such as transmitting the signal to other circuits (for example, a down converter) for further processing. As with the transmitting-end BFIC 21, each active RF module 2 can have an independent receiving-end BFIC 27, or a plurality of active RF modules 2 can share one receiving-end BFIC 27.

Referring again to FIG. 1 to FIG. 4, it can be known from the above that although the antenna device A1 uses M*N antenna units 111, the antenna units 111 in the same group share one power amplifier 23 and one low-noise amplifier 25. Consequently, the total number of the power amplifiers 23 used in the antenna device A1 is M, and the total number of the low-noise amplifiers 25 used in the antenna device A1 is also M. Compared with the design of a conventional active array antenna (in which M*N power amplifiers 23 and M*N low-noise amplifiers 25 are required), the design of the antenna device A1 in the present disclosure allows an about N-times reduction in cost and reduces the time required for control signal transmission between electronic components by about N times too. This contributes to not only reducing the delay of electronic scanning greatly, but also reducing the heat generated by the antenna device A1 during operation such that the difficulty of designing the heat dissipation structure is lowered.

Figure 2:
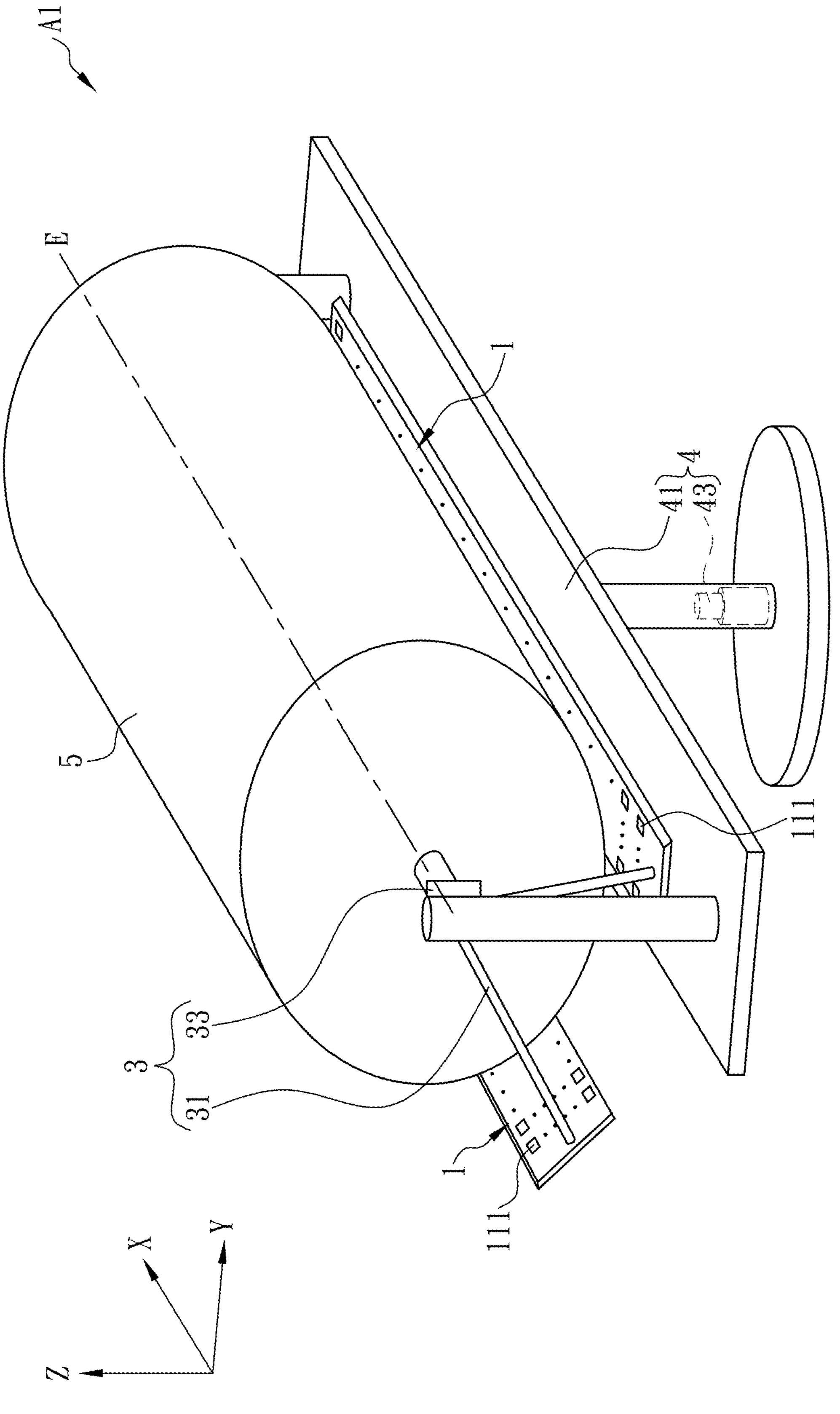
FIG. 2 is a perspective view of the antenna device according to certain embodiments of the present disclosure.

Referring to FIG. 1 and FIG. 2, each swinging portion 3 includes at least one swinging member 31 and a motor 33 for producing a swinging motion (for example but not limited to a stepper motor; hereinafter referred to as the swinging motor 33 for short). The swinging member 31 of each swinging portion 3 has a first end connected to the corresponding antenna module 1 and a second end connected to the corresponding swinging motor 33. For example, in the configuration shown in FIG. 2, one swinging motor 33 is provided at each of two opposite lateral sides of the lens mechanism 5, and when in operation, each swinging motor 33 can drive the corresponding swinging member 31 into rotation and thereby rotate the corresponding antenna module 1 synchronously. Each antenna module 1 can be swung along a circular arc around a center of circle defined by the second end of the corresponding swinging member 31 (i.e., by a central support point C), with the radius of rotation defined by the corresponding swinging member 31 (see FIG. 5). When a swinging portion 3 is in operation, a focused beam of the corresponding antenna module 1 that is for transmitting an active RF signal (and a radiation pattern of the corresponding antenna module 1 that is for receiving an external RF signal) forms an angle β with the vertical axis (Z axis), wherein the angle β can be 0 degree or any angle greater than 0 degree so as to supplement or enhance the corresponding antenna module 1's ability to scan in a one-dimensional direction (e.g., in a plane defined by sweeping through a polar angle). It should be pointed out that the drawings serve illustrative purposes only, and when two swinging members 31 share a pivot shaft, each swinging motor 33 will still drive only the corresponding swinging member 31, meaning that each swinging member 31 can be driven only by the corresponding swinging motor 33; in other words, one swinging member 31 can be swinging while the other swinging member 31 is left idle; and when two swinging members 31 do not share a pivot shaft, the antenna device A1 will have two central support points C, and each antenna module 1 will be swung around a center of circle defined by the corresponding central support point C; macroscopically, however, the two central support points C can still be viewed as one central support point C (or center of circle), and the antenna device A1 as swung around this center of circle.

Figure 5:
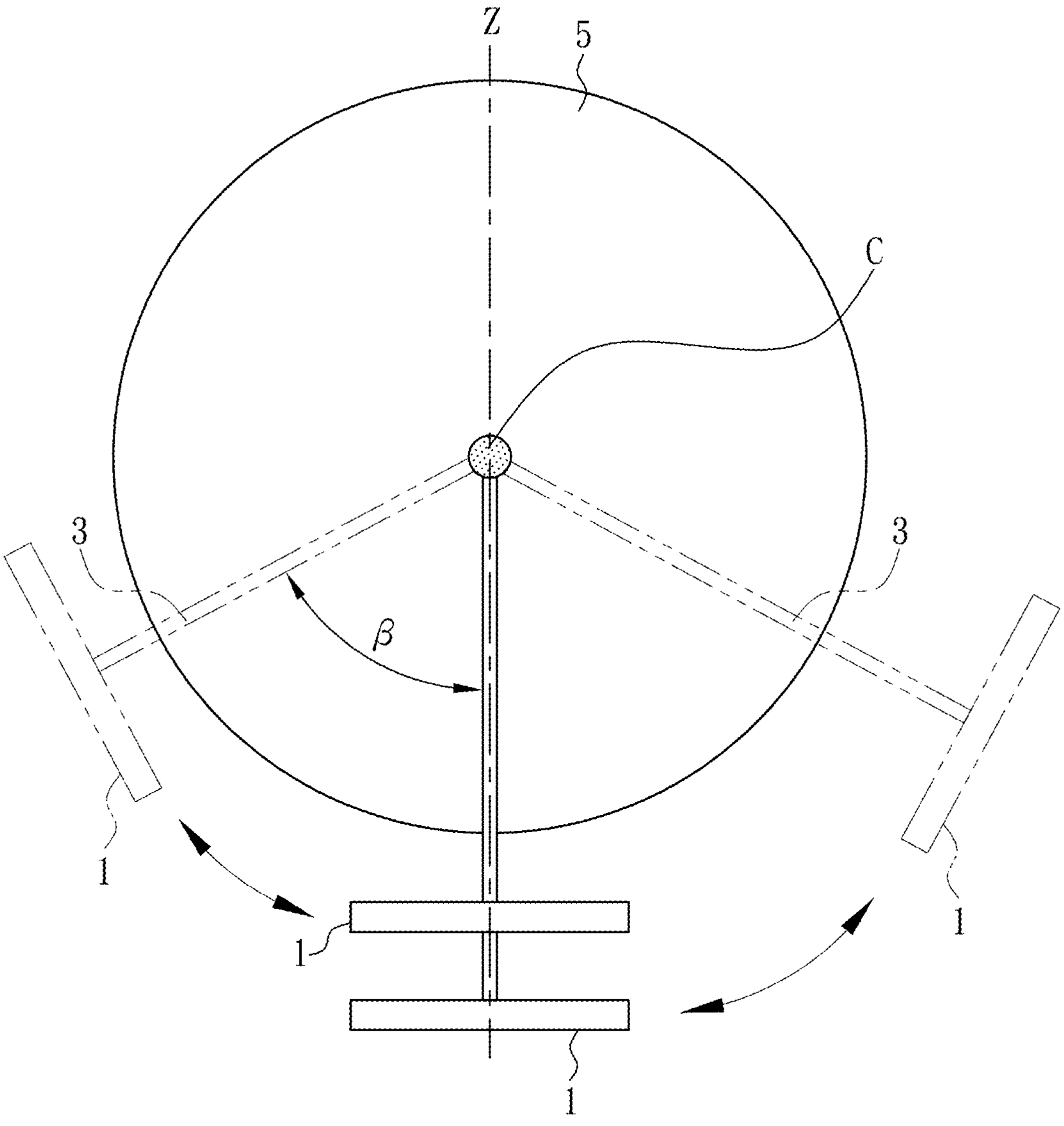
FIG. 5 is a schematic diagram showing the swinging of antenna modules according to certain embodiments of the present disclosure.
Figure 6A:
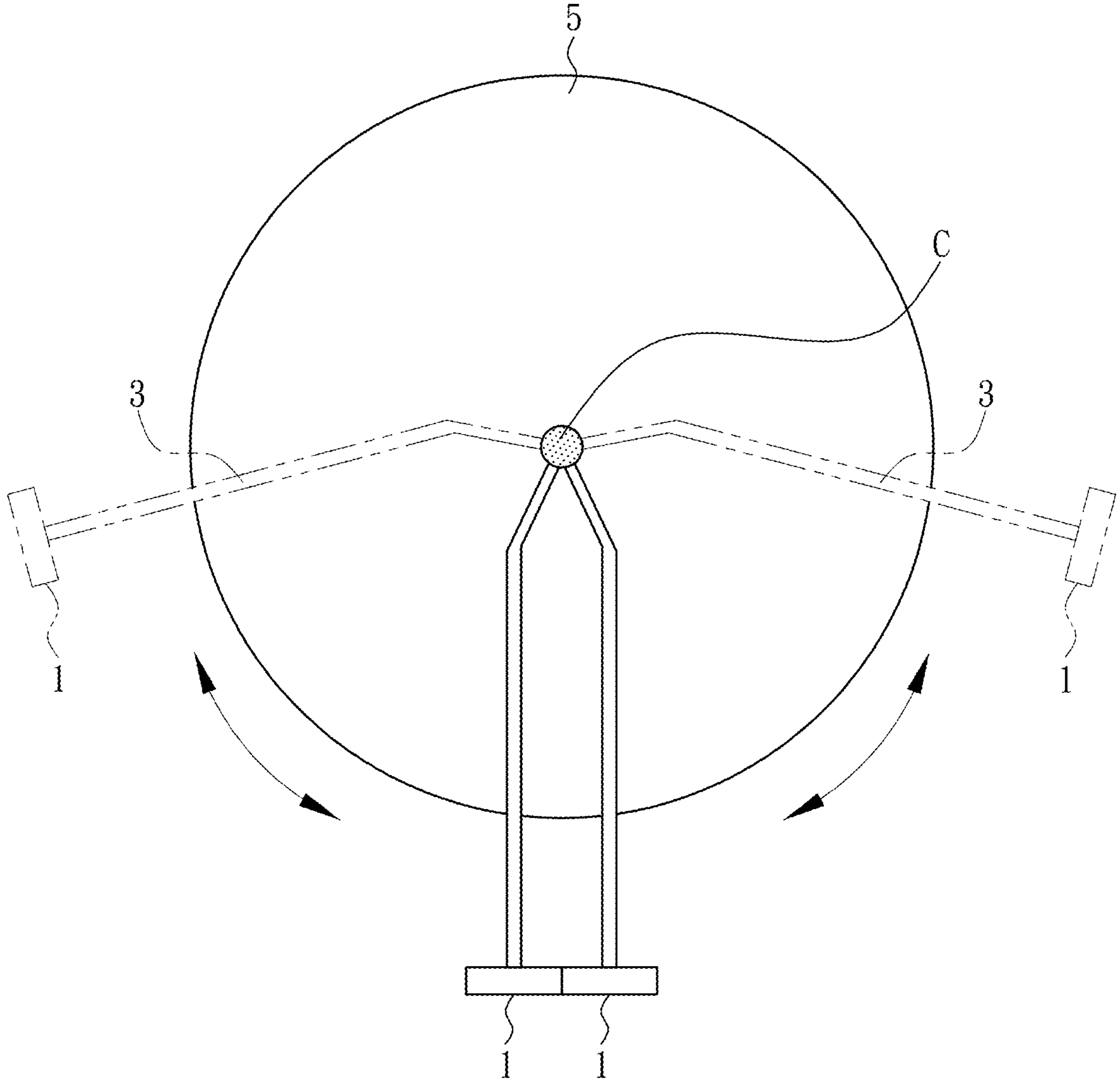
FIG. 6A is a schematic diagram showing the swinging of antenna modules according to certain embodiments of the present disclosure.
Figure 6B:
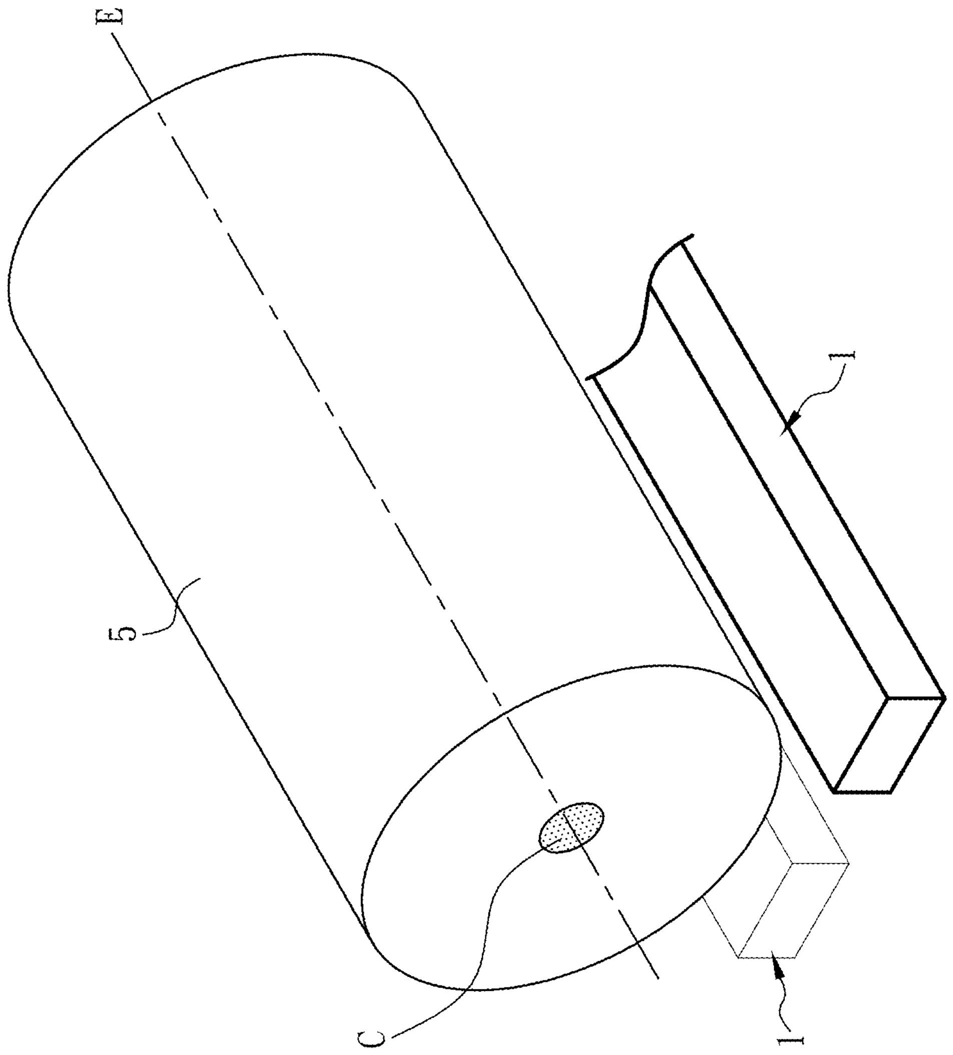
FIG. 6B is a perspective partial view of antenna modules according to certain embodiments of the present disclosure.

In certain embodiments, referring to FIG. 5, the swing starting position of each antenna module 1 is a position right under the central support point C (with reference to the directions in FIG. 5), and this position is defined as having a swing angle of 0 degree. The angle β between the beam of each antenna module 1 at this position and the vertical axis is also 0 degree. One of the antenna modules 1 can be swung leftward from the swing starting position up to, for example but not limited to, 90 degrees, and the other antenna module 1 can be swung rightward from the swing starting position up to, for example but not limited to, 90 degrees, thereby changing the angle β between the beam of each antenna module 1 and the vertical axis, so as to enable tracking of and searching for satellites. In certain embodiments, the swinging members 31 of the antenna modules 1 have different lengths so that the antenna modules 1 can be located one above the other, or in vertical alignment, when at the swing starting position (as shown in FIG. 5). In certain embodiments, referring to FIG. 6A and FIG. 6B, the antenna modules 1 can be side by side horizontally (with reference to the directions in FIG. 6A) when arriving at the swing starting position at the same time, with the two antenna modules 1 either abutting against each other (as shown in FIG. 6A) or spaced apart from each other (as shown in FIG. 6B). In certain embodiments, when the antenna modules 1 have substantially the same swing starting position, the swinging directions of the antenna modules 1 can be different. In certain embodiments, when the antenna modules 1 have substantially different swing starting positions, the swinging directions of the antenna modules 1 can be the same (but are not necessarily so).

Referring to FIG. 1 and FIG. 2, the rotating portion 4 is connected to the swinging portions 3 and is configured to drive the swinging portions 3 to rotate as a whole such that the antenna modules 1 on the swinging portions 3 are rotated along with the swinging portions 3, so as to supplement or enhance the antenna modules 1's ability to scan in a plane defined by sweeping through an azimuthal angle. The rotating portion 4 can make the antenna modules 1 rotate around (i.e. spinning on or revolving around) (e.g., in a single direction such as clockwise or counterclockwise, or in alternating clockwise and counterclockwise directions) an axis (e.g., the vertical axis) that is different from the axis around which the antenna modules 1 are driven to swing by the swinging portions 3 (e.g., the transverse axis). In certain embodiments, the rotating portion 4 includes a supporting body 41 and a motor 43 for producing a rotary motion (hereinafter referred to as the rotational motor 43 for short). The supporting body 41 is in the form of a platform. The swinging portions 3 and the antenna modules 1 thereon can be located on the top side of the supporting body 41, with the rotational motor 43 located in a bottom portion of the supporting body 41 and configured to rotate the supporting body 41 such that the elements on the supporting body 41 (e.g., the swinging portions 3 and the antenna modules 1) are rotated along with the supporting body 41. In certain embodiments, however, the structure of the rotating portion 4 can be adjusted according to product requirements, as long as a rotating portion can drive the antenna modules 1 to rotate as a whole, it falls within the scope of the rotating portion 4 defined in the present disclosure.

Figure 7A:
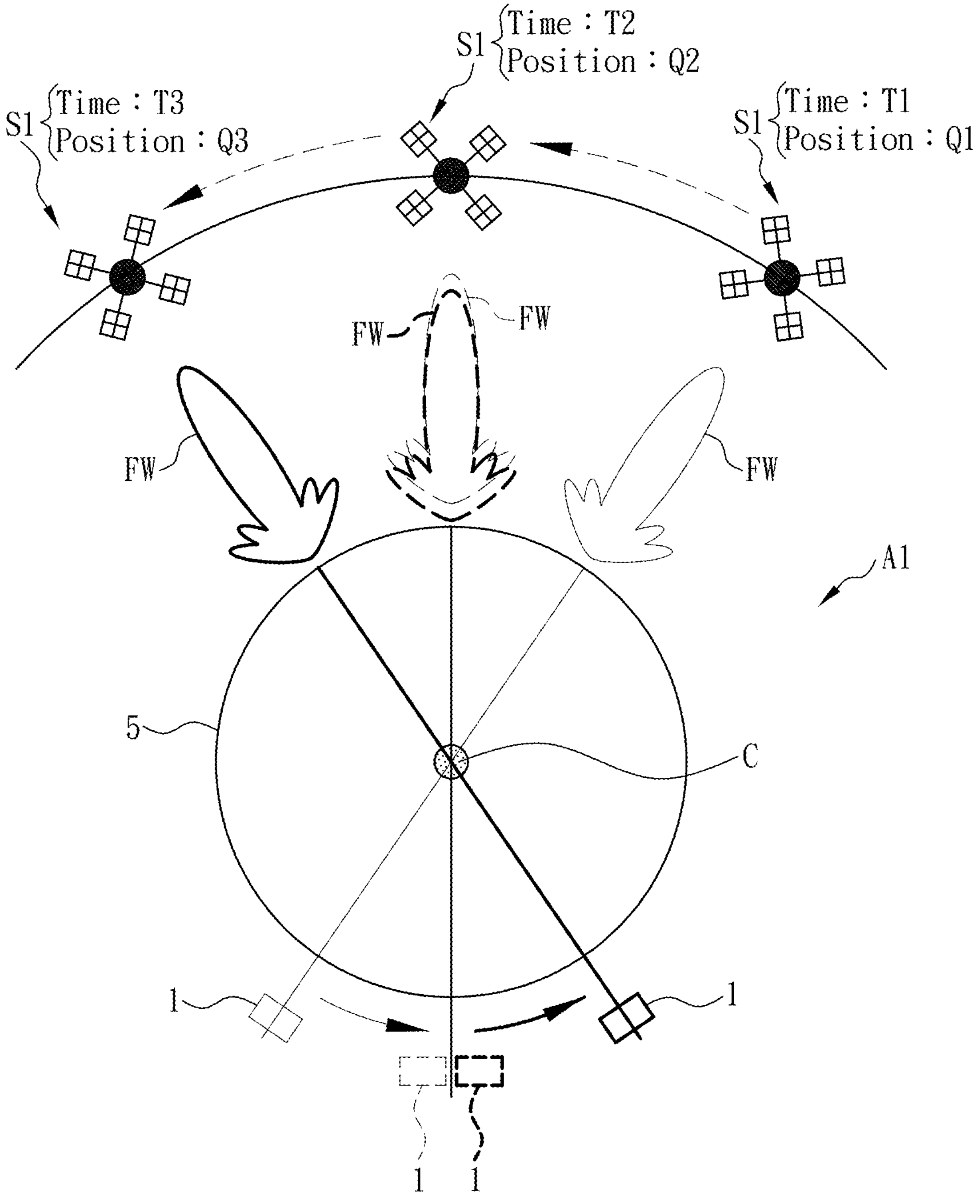
FIG. 7A is a schematic diagram showing a satellite-tracking operation of an antenna device according to certain embodiments of the present disclosure.

Referring again to FIG. 1 to FIG. 6B, an extension line E of the central support point C along the XY plane extends through a portion of the lens mechanism 5 (see FIG. 6) such that each antenna module 1 can be swung along a circular arc around the periphery of the lens mechanism 5. Referring to FIG. 7A, the lens mechanism 5 is in the form of a focusing lens and can therefore form a focal point with respect to each antenna module 1. The lens mechanism 5 can receive the focused radiation beam transmitted from each antenna module 1, generate a corresponding secondary beam FW by focusing the radiation, and emit the secondary beam FW from the side of the lens mechanism 5 that is opposite to the antenna module 1. In cases where the space for accommodating the focal point position (i.e., the space between the antenna modules 1 and the lens mechanism 5) is relatively small, each antenna module 1 can use a relatively small number of (e.g., 1 to 3) antenna units 111 or even form a one-dimensional array antenna instead of a multiple-dimensional array antenna, which not only reduces the overall volume of each antenna module 1, but also prevents the two antenna modules 1 from collision when they approach each other and switch the satellite being tracked to each other.

Figure 7B:
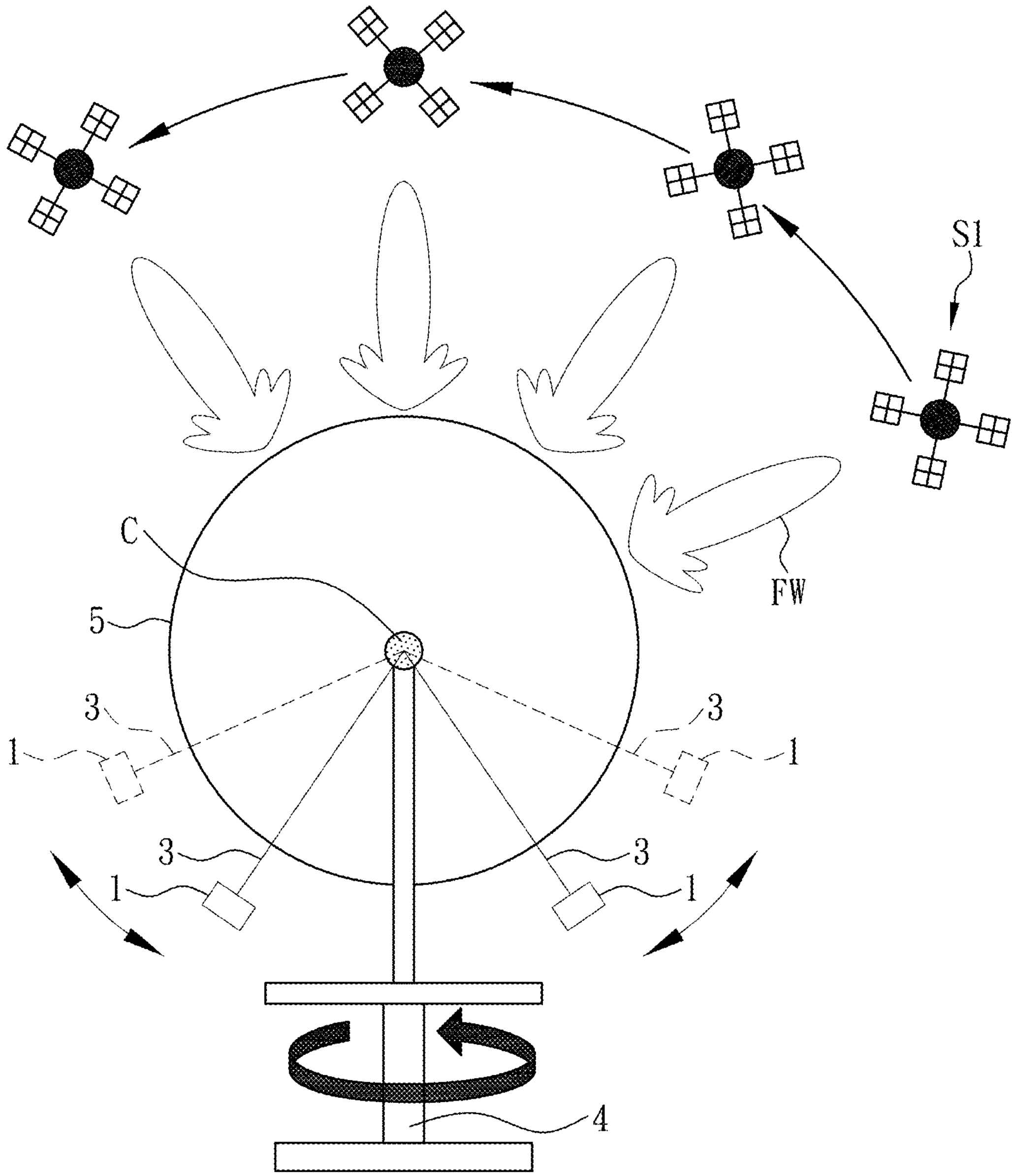
FIG. 7B is a schematic diagram showing another satellite-tracking operation of the antenna device according to certain embodiments of the present disclosure.

The way the antenna device A1 tracks satellites is described infra with reference to FIG. 7A and FIG. 7B. Assume the satellite S1 moves along its orbit from right to left (with reference to the directions in FIG. 7A), and moves from the first position Q1 through the second position Q2 to the third position Q3 as the time progresses from the time point T1 through the time point T2 to the time point T3. The rotating portion 4 can rotate the antenna device A1 to the orbit plane (i.e., a plane defined by sweeping through an angle phi), and the swing starting positions of both antenna modules 1 are a position right under the central support point C. In FIG. 7B, the antenna module 1 on the left is moved leftward from its swing starting position and then rightward back to the swing starting position reciprocatingly, and the antenna module 1 on the right is moved rightward from its swing starting position and then leftward back to the swing starting position reciprocatingly. In other words, with reference to the directions in FIG. 1, the antenna modules 1 are spread apart laterally from a central position and then brought close to each other, i.e., back to the central position. Once the antenna module 1 on the left of FIG. 7A is swung leftward to a specific angle from its swing starting position and links to the satellite S1, the same antenna module 1 begins to track the satellite S1 while the antenna module 1 on the right can wait at its swing starting position. While the satellite S1 moves from the first position Q1 to the second position Q2, the antenna module 1 on the left is gradually moved back to its swing starting position. The two antenna modules 1 eventually become adjacent to each other, with their respective secondary beams FW overlapping to an appropriate extent. As the satellite S1 is now in an area corresponding to the overlap of the secondary beams FW, the antenna modules 1 perform a satellite handover process. After that, the antenna module 1 on the right starts to track the satellite S1 and is gradually swung rightward as the satellite S1 moves from the second position Q2 to the third position Q3, and the antenna module 1 on the left is swung leftward to the specific angle to wait for the rise of another satellite. Thus, the swinging portions 3 drive the antenna modules 1 to carry out a tracking operation in a plane defined be sweeping through an angle theta. That is, the antenna modules 1 can be swung away from and toward each other by the swinging portions 3 so that while one of the antenna modules 1 is tracking a satellite, the other antenna module 1 can return to its original position to wait for another satellite to link to. To prevent the two antenna modules 1 from blocking each other's radiation when they are spread apart (i.e., when they have been swung away from each other), in certain embodiments, the maximum spread-apart angle between the two antenna modules 1 can be set at, for example but not limited to, 45-55 degrees.

Figure 8:
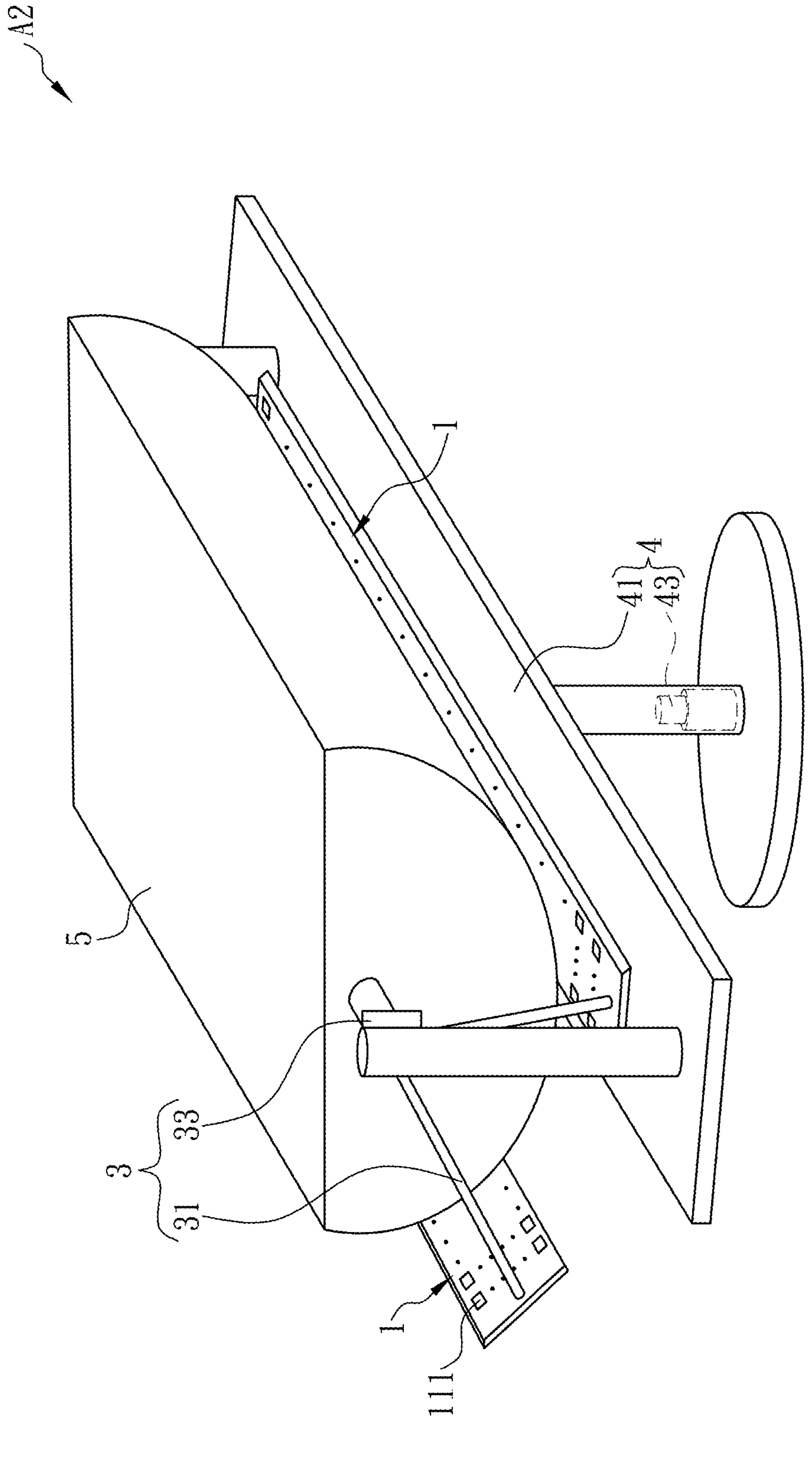
FIG. 8 is a perspective view of an antenna device according to certain embodiments of the present disclosure.

Depending on actual product requirements, the form of the lens mechanism 5 can be varied. Since the lens mechanism 5 is intended to produce high radiation gain by focusing, and the antenna modules 1 are required to rotate along a cylindrical plane, the lens mechanism 5 in certain embodiments has a substantially cylindrical shape as shown in FIG. 2, wherein the symmetric configuration of the cylindrical shape enables the generation of identical beams. However, as the antenna modules 1 are rotated mainly around the lower half of the lens mechanism 5 (with reference to the directions in FIG. 1), the upper half of the lens mechanism 5 can have a diversity of designs and be optimized to meet practical needs. Certain embodiments described infra are mainly directed to certain differences in elements from those in certain embodiments described supra, and certain elements unchanged are designated by the same reference numerals as in certain embodiments described supra and will not be described repeatedly. Referring to FIG. 8, in certain embodiments, the lens mechanism 5 used in an antenna device A2 is in the shape of a semicylinder, and one side of the lens mechanism 5 (e.g., the side corresponding to an upper-side area of FIG. 8) has a cut-off surface. The swinging area of the antenna modules 1 is substantially on the side of the lens mechanism 5 that faces away from the cut-off surface (e.g., the side corresponding to a lower-side area of FIG. 8).

The lens mechanism 5 can be a solid structure or a synthetic material composite having a metamaterial structure. In certain embodiments, a two-dimensional structure can be designed based on the principle of a Luneburg lens. For example, the cross section of a cylinder can be so designed that the dielectric constant is distributed in a way similar to that in a Luneburg lens, i.e., with the dielectric constant being 2 at the center of circle and changed to 1 (which is equivalent to the dielectric constant of air) toward the circumference, wherein the dielectric constant is changed continuously in an outward radial direction from the center according to the following equation:

$$\varepsilon_r(r) = 2 - \left(\frac{r}{\alpha}\right)^2$$

where $\varepsilon_r(r)$ is the dielectric constant, $\alpha$ is the greatest radius of the cylinder, r is the distance from the center of the cylinder to a specific position, and the value of r is in the range from 0 to $\alpha$.

In certain embodiments, a two-dimensional structure can be designed based on the principle of a fisheye lens. For example, the cross section of a cylinder can be so designed that the dielectric constant is distributed in a way similar to that in a fisheye lens, i.e., with the dielectric constant being 4 at the center of circle and changed to 1 (which is equivalent to the dielectric constant of air) toward the circumference, wherein the dielectric constant is changed continuously in an outward radial direction from the center according to the equation below:

$$\varepsilon_r(r) = \frac{\varepsilon_r^c}{\left(1+\left(\frac{r}{\alpha}\right)^2\right)^2}$$

where $\varepsilon_r(r)$ is the dielectric constant, $\alpha$ is the greatest radius of the cylinder, r is the distance from the center of the cylinder to a specific position, and $$\varepsilon_r^c$$

is the dielectric constant at the center (where r=0).

The scope of the lens mechanism 5, however, is not limited to the designs described above, and encompasses those whose changes in dielectric constant are equivalent to that in the above two configurations and produce an effect of the dielectric constant increasing toward the center. Besides, in certain embodiments described supra, the dielectric constant of the lens mechanism 5 is continuous along the horizontal axis, and the length of the lens mechanism 5 along the horizontal axis is greater than the length of the antenna modules 1 (i.e., of the array antennas) and can be about twice as great, depending on the angle of horizontal electronic scanning.

Figure 9A:
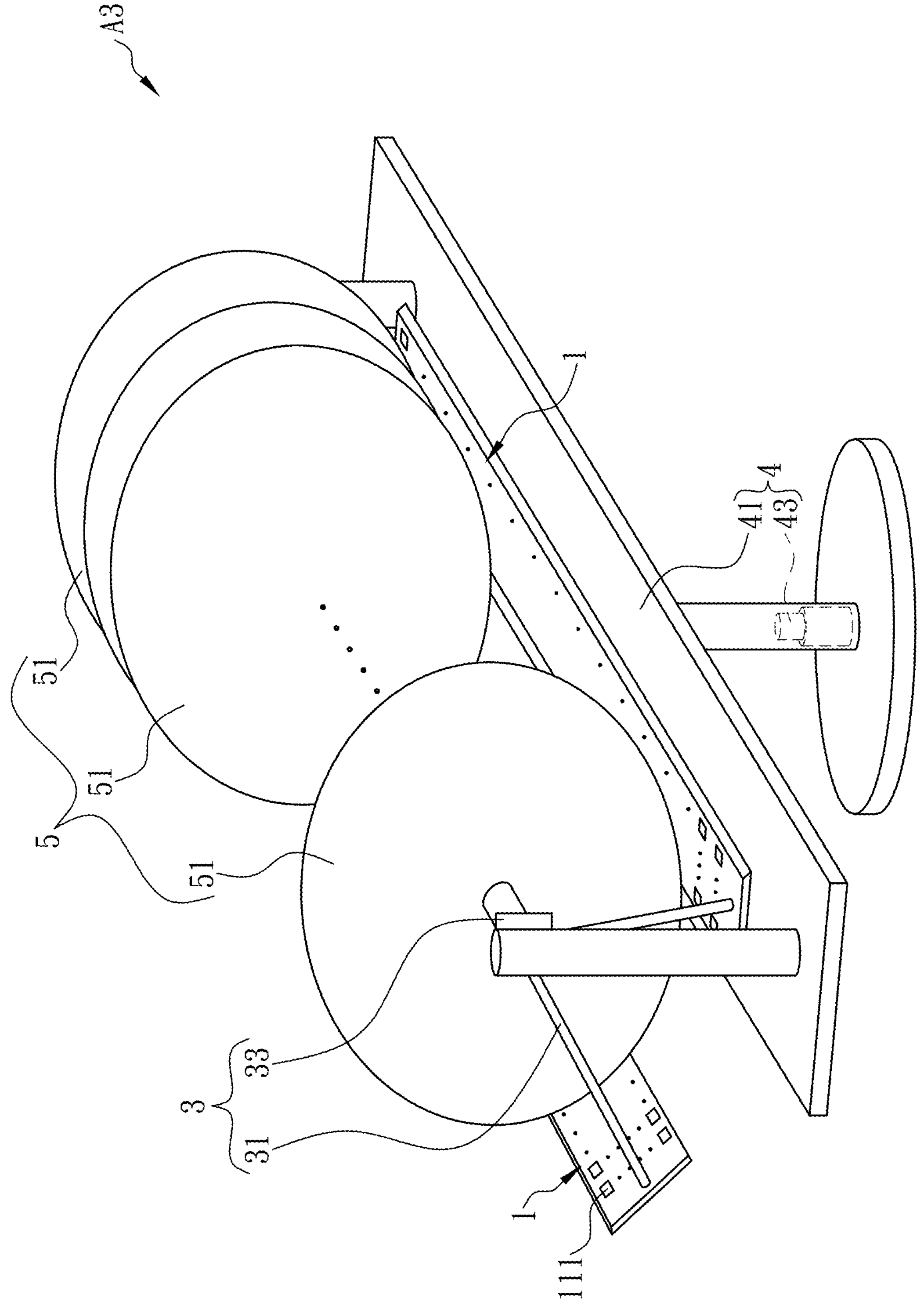
FIG. 9A is a perspective view of an antenna device according to certain embodiments of the present disclosure.
Figure 9B:
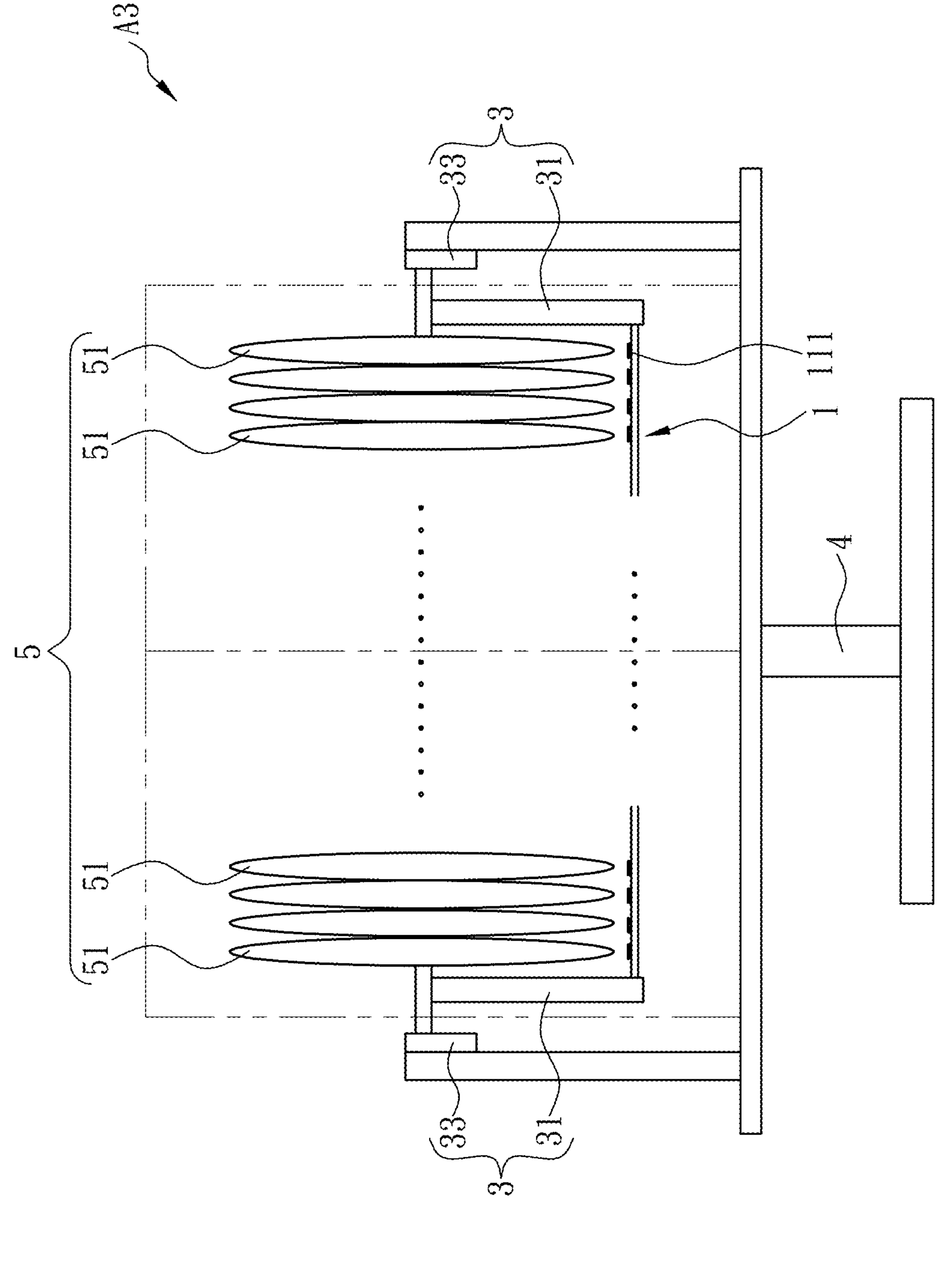
FIG. 9B is a side view of the antenna device according to certain embodiments of the present disclosure.

In certain embodiments, referring to FIG. 9A and FIG. 9B, the lens mechanism 5 used in an antenna device A3 can be formed by connecting a plurality of lens disks 51 in series along an axial direction (e.g., along the transverse axis) to form a cylindrical structure. This structure allows each lens disk 51 to be individually designed and manufactured before the lens disks 51 are put together as required. In FIG. 9B, for example, the plural lens disks 51 on the left (i.e., the lens disks 51 in the left imaginary dash-dot-dot-line frame) serve to transmit active RF signals, and the plural lens disks 51 on the right (i.e., the lens disks 51 in the right imaginary dash-dot-dot-line frame) serve to receive external RF signals. The arrangement of the lens disks 51, however, is not limited to the above. The antenna units 111 of each antenna module 1 can be arranged according to the use-oriented arrangement of the lens disks 51 as well. This lens structure helps reduce the weight and production cost of the lens mechanism 5, has a relatively simple production process (e.g., press molding), allows a single material to be used in equivalent shape forming operations, and therefore does not require the use of various kinds of materials each having a different dielectric constant. In addition, the lens disks 51 can be designed to effectively control and guide the propagation of electromagnetic waves, in particular by the lens disks 51 producing an energy-binding effect. This means that electromagnetic waves can propagate through the lens disks 51 in a specific way to produce the desired radiation pattern. The energy-binding effect can be realized, for example, by using a material with a high dielectric constant. Besides, to reduce interference among the lens disks 51, each lens disk 51 can be designed to work independently. For example, the two sides of each lens disk 51 can be coated with a metal paint to form parallel-plate waveguides that isolate the lens disk from the adjacent ones completely to reduce interference among the lens disks 51 and thereby increase the performance and efficiency of the antenna device A3 as a whole.

Figure 10A:
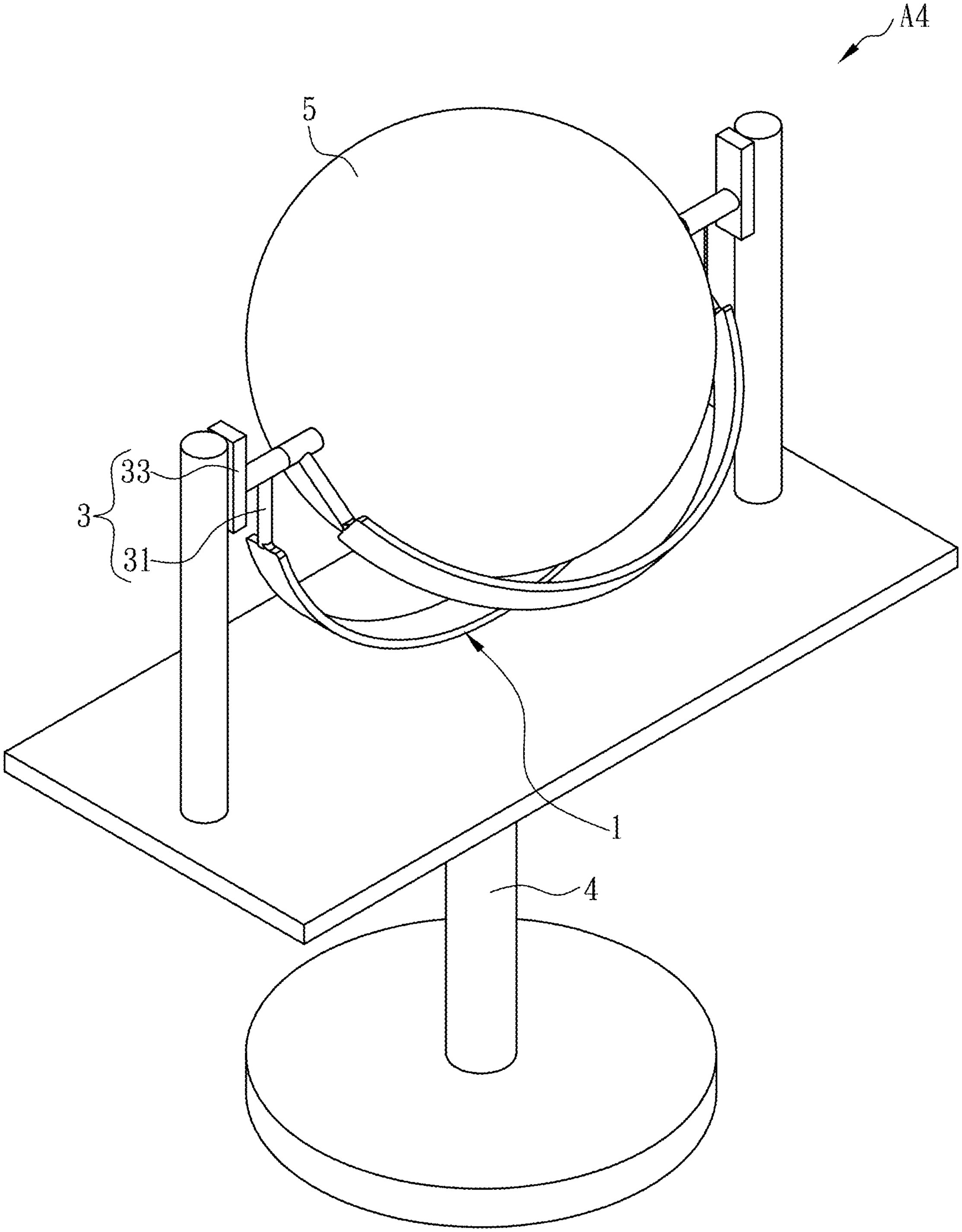
FIG. 10A is a perspective view of an antenna device according to certain embodiments of the present disclosure.
Figure 10B:
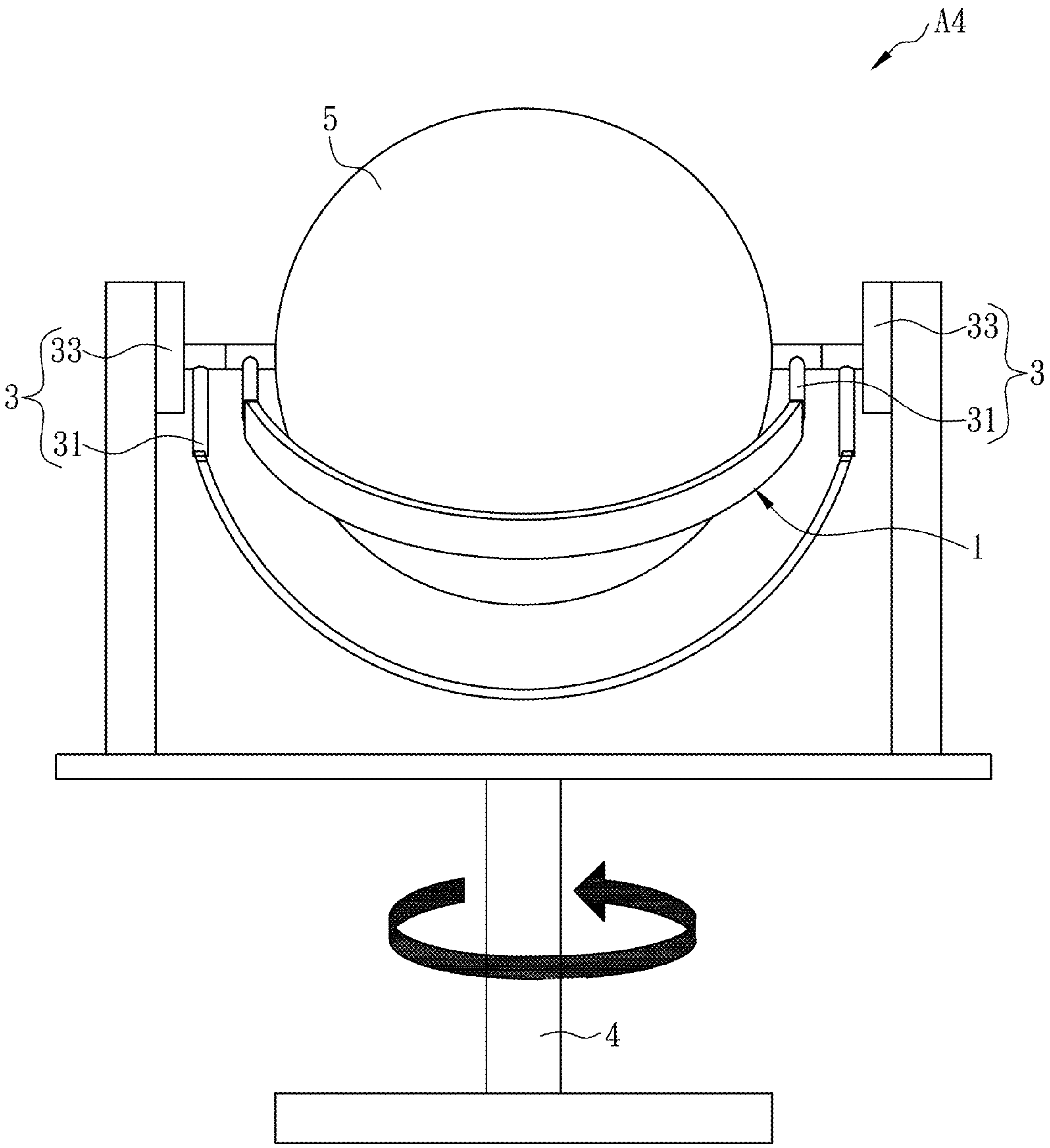
FIG. 10B is a side view of the antenna device according to certain embodiments of the present disclosure.

In certain embodiments, referring to FIG. 10A and FIG. 10B, the lens mechanism 5 of an antenna device A4 is a three-dimensional lens having a spherical shape (e.g., a Luneburg lens) or a hemispherical shape (e.g., a fisheye lens) instead of a columnar structure. Accordingly, there is no need to use a relatively long lens mechanism 5, and the physical volume and size of the lens mechanism 5 can be reduced. A spherical lens mechanism 5 can concentrate or focus electromagnetic waves in two dimensions (e.g., in a horizontal direction and a vertical direction) and thereby control the directions and shapes of the resulting beams, so the phase shifter of a BFIC is not required for one-dimensional electronic scanning. When the antenna modules 1 adopts circularly polarized radiation, the array antenna used by each antenna module 1 can have a curved configuration or layout. However, the present disclosure is not limited thereto. In certain embodiments, an antenna module 1 can have only one antenna unit group 11, and the antenna unit group 11 can have only one antenna unit 111. In addition, the swinging portion 3 corresponding to each antenna module 1 can use a different motor so that the rotation direction and rotation speed of each antenna module 1 can be independently controlled, so as to prevent a difference between the direction of the beam generated by the antenna module 1 and a satellite direction of interest during the continuous operation of either antenna module 1.

Figure 11:
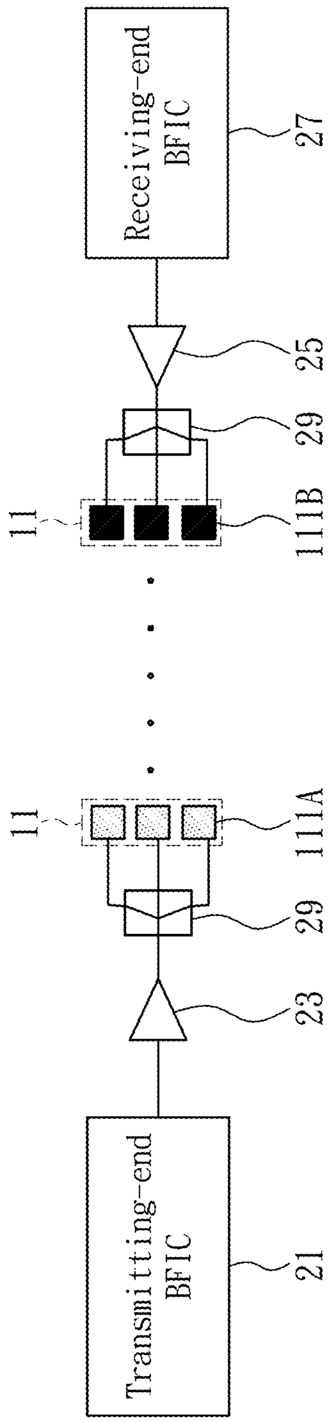
FIG. 11 is a schematic diagram of the circuitry of the antenna module(s) and active RF module(s) according to certain embodiments of the present disclosure.

In certain embodiments, with continued reference to FIG. 10A and FIG. 10B, there can be only one antenna module 1, wherein the antenna module 1 is in the form of an array antenna and has a curved configuration and layout, with at least one electronic switch 29 provided between each antenna unit group 11 and the corresponding active RF module 2 (see FIG. 11). Due to the switching function of the electronic switches 29, the antenna unit group 11 currently in operation can be changed to allow the beam of the antenna module 1 to be focused through different portions of the lens mechanism 5, thereby producing a beam shifting effect to enable tracking of satellite movement. In this configuration, the swinging portion 3 and the rotating portion 4 can help the antenna module 1 better search for and track satellites. In certain embodiments, the rotating portion 4 can be dispensed with, and the antenna device A4 can have the two antenna modules 1 and two swinging portions 3 in certain embodiments described supra related to FIG. 10A and FIG. 10B and the array antenna configuration and electronic switches 29 (see FIG. 11) to track satellites. For example, the electronic switches 29 can be used to change the beam direction of each antenna module 1, and each of the two swinging portions 3 can be used to drive, and thereby adjust the position of, the corresponding antenna module 1 to facilitate satellite tracking.

Figure 12:
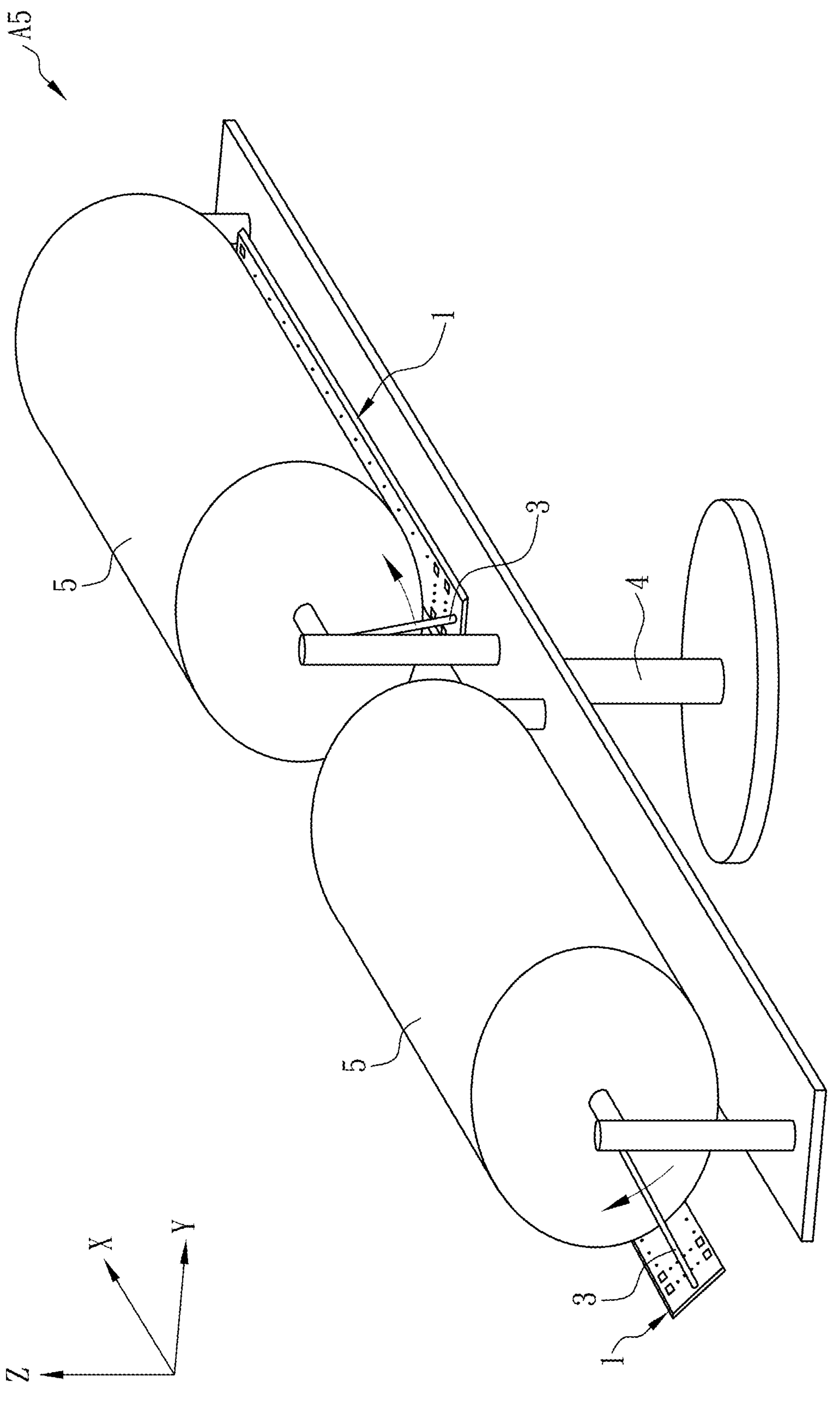
FIG. 12 is a perspective view of an antenna device according to certain embodiments of the present disclosure.

In certain embodiments, referring to FIG. 12, the antenna device A5 has two lens mechanisms 5. Each lens mechanism 5 can have a cylindrical, semicylindrical, or spherical shape, for example. Moreover, each lens mechanism 5 has one swinging portion 3 and one antenna module 1. The lens mechanisms 5 can be arranged along the transverse direction (or the first direction) such that the antenna modules 1 are also arranged in the transverse direction (or the first direction) and can be driven to swing in the longitudinal direction (or the second direction). In other words, the lens mechanisms 5 and antenna modules 1 are arranged differently from their counterparts in certain embodiments described supra where two antenna modules are arranged along the longitudinal direction (or the second direction) and are also swung in the longitudinal direction (or the second direction) along their respective circular arcs. In the antenna device A5, if the antenna modules 1 have the same swing starting positions, one of the antenna modules 1 can be swung along a circular arc from the swing starting position toward one end of the longitudinal axis and then back to the swing starting position reciprocatingly, and the other antenna module 1 can be swung along a circular arc from the swing starting position toward the other end of the longitudinal axis and then back to the swing starting position reciprocatingly. That is, in the antenna device A5, the two antenna modules 1 in certain embodiments described supra are separated in such a way that the two antenna modules 1 are no longer at the same position but are at two separate positions. The antenna device A5 is equally capable of performing the satellite tracking function described above, and the two antenna modules 1 of the antenna device A5 can carry out satellite handover and position restoration just as well as their counterparts in certain embodiments described supra. Furthermore, as the antenna modules 1 are substantially connected in series (i.e., arranged next to each other along the transverse axis and sharing the same rotation axis), collision will not occur during the swinging process, and the rotation angle of each antenna module 1 can be doubled at least, such that the satellite tracking time of each antenna module 1 is extended.

For example, with continued reference to FIG. 12, when the antenna module 1 on the left is rotated clockwise (as seen in side view) to track a satellite (defined as the first satellite), the antenna module 1 on the right can be rotated counterclockwise to search for the next satellite (defined as the second satellite). Once the antenna module 1 on the right is linked to the second satellite, the link between the antenna module 1 on the left and the first satellite is cut off (at which time the first satellite has moved to a position where it begins to go below the horizon). Thus, the antenna module 1 on the left and the antenna module 1 on the right alternate their respective rotation directions in order to track the first satellite and search for the second satellite to link to. Moreover, during the aforesaid operation, only one of the antenna modules 1 is required to link to and track a satellite, and the other antenna module 1 works to search for the next satellite to link to. In certain embodiments, therefore, the antenna device A5 can be provided with only one active RF module 2 (see FIG. 4), and this active RF module 2 can be electrically connected to the two antenna modules 1 through one multi-way switch. In other words, the antenna unit groups 11 corresponding to each other in the two antenna modules 1 can share one active RF module 2, with the ON and OFF states of the multi-way switch controlled according to practical needs (e.g., to track a LEO satellite) such that the antenna module 1 currently used to track and link to a satellite is electrically connected to the active RF module 2 to generate the desired focused beam while the other antenna module 1, which is used to search for another satellite to link to, is not electrically connected to the active RF module 2. In certain embodiments, when the antenna device A5 is used to track a geostationary-Earth-orbit (GEO) satellite, the swinging directions and positions of the two antenna modules 1 can be identical (i.e., the antenna modules 1 can be swung synchronously), and the antenna modules 1 can be electrically connected to the active RF module 2 at the same time in order to work in concert with each other, thereby simulating an antenna structure with an even higher gain so as to be able to jointly track the same GEO satellite. This configuration can increase the gain of the antenna modules 1 by 3 dB and raise the effective isotropic radiated power (EIRP) of the antenna modules 1 by 6 dB.

Figure 13A:
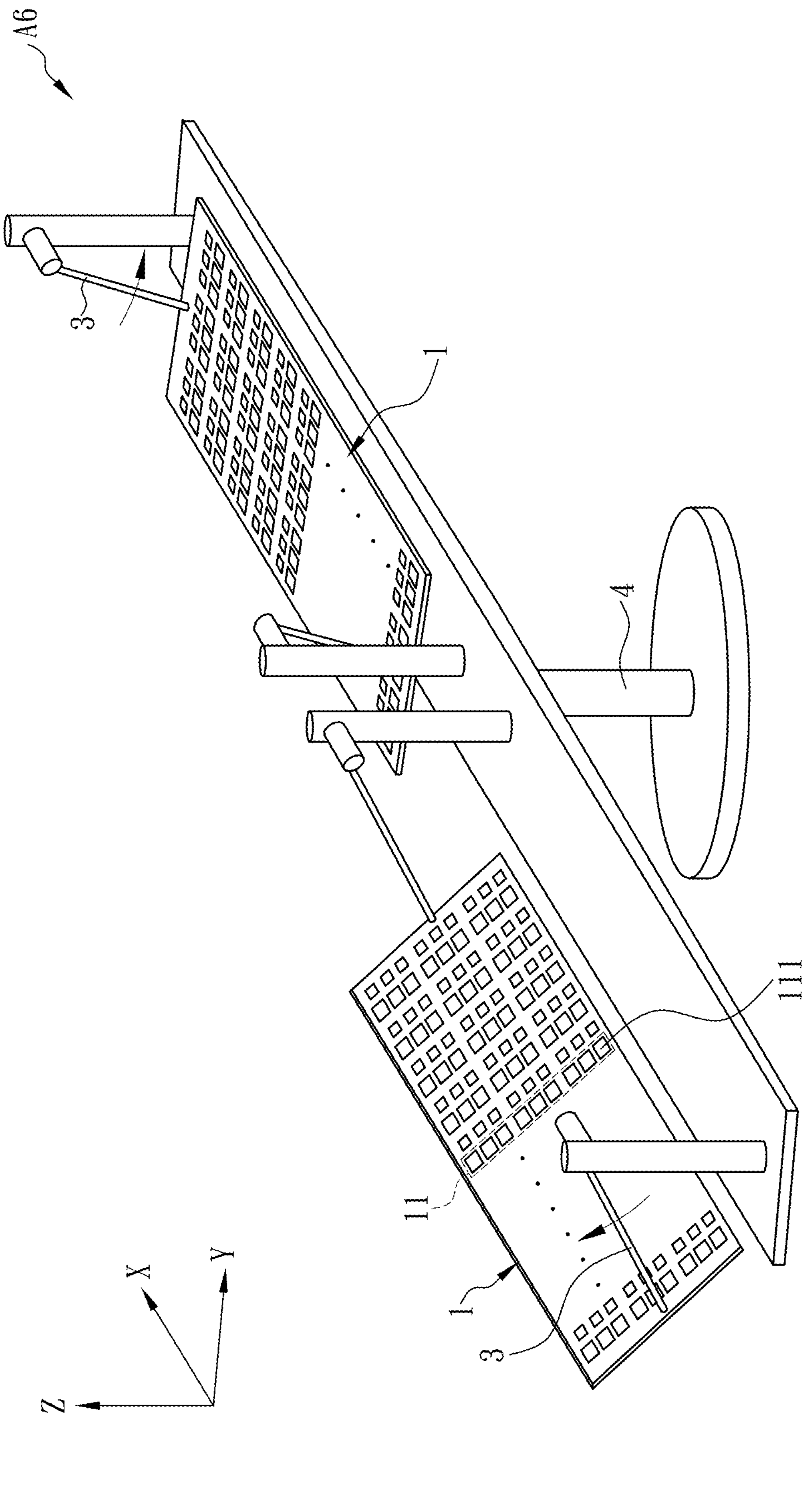
FIG. 13A is a perspective view of an antenna device according to certain embodiments of the present disclosure.
Figure 13B:
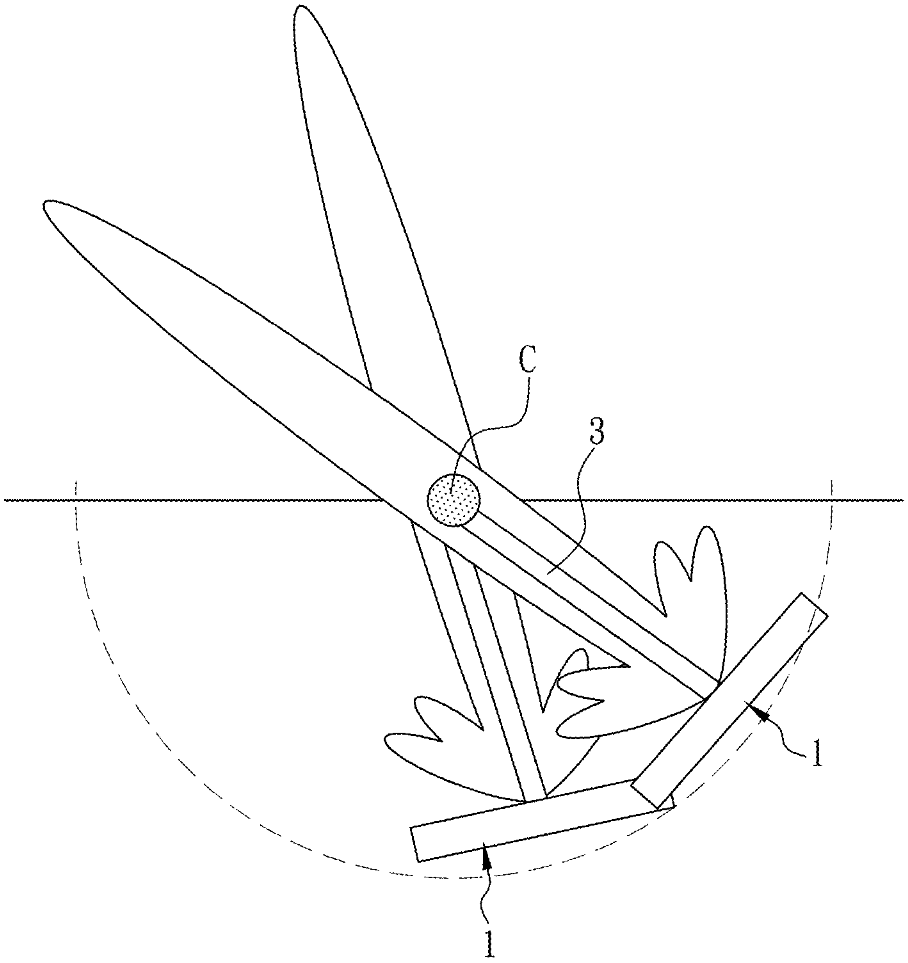
FIG. 13B is a schematic diagram showing each central support point being located forward of the corresponding antenna module according to certain embodiments of the present disclosure.
Figure 14A:
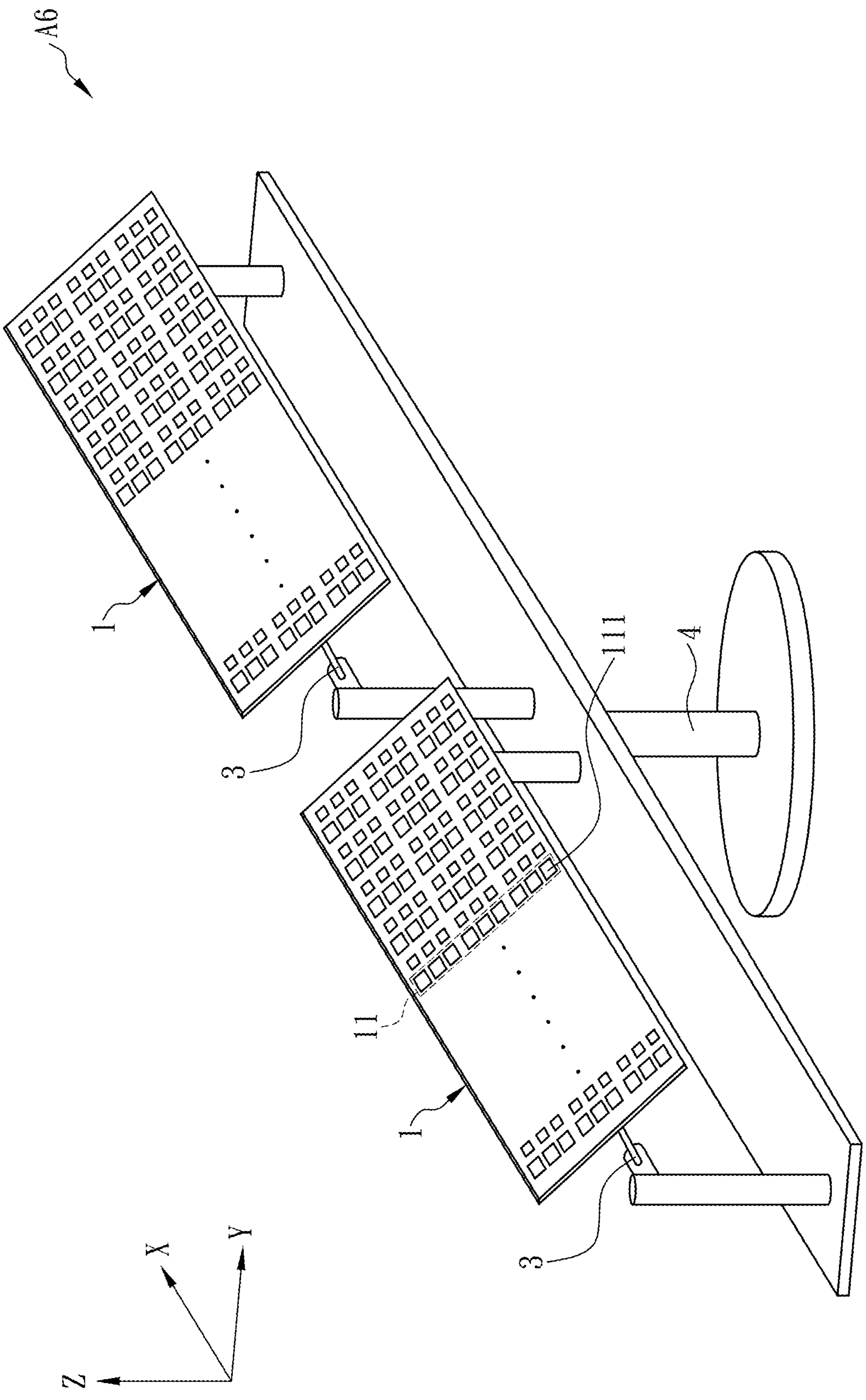
FIG. 14A is a perspective view of an antenna device according to certain embodiments of the present disclosure.
Figure 14B:
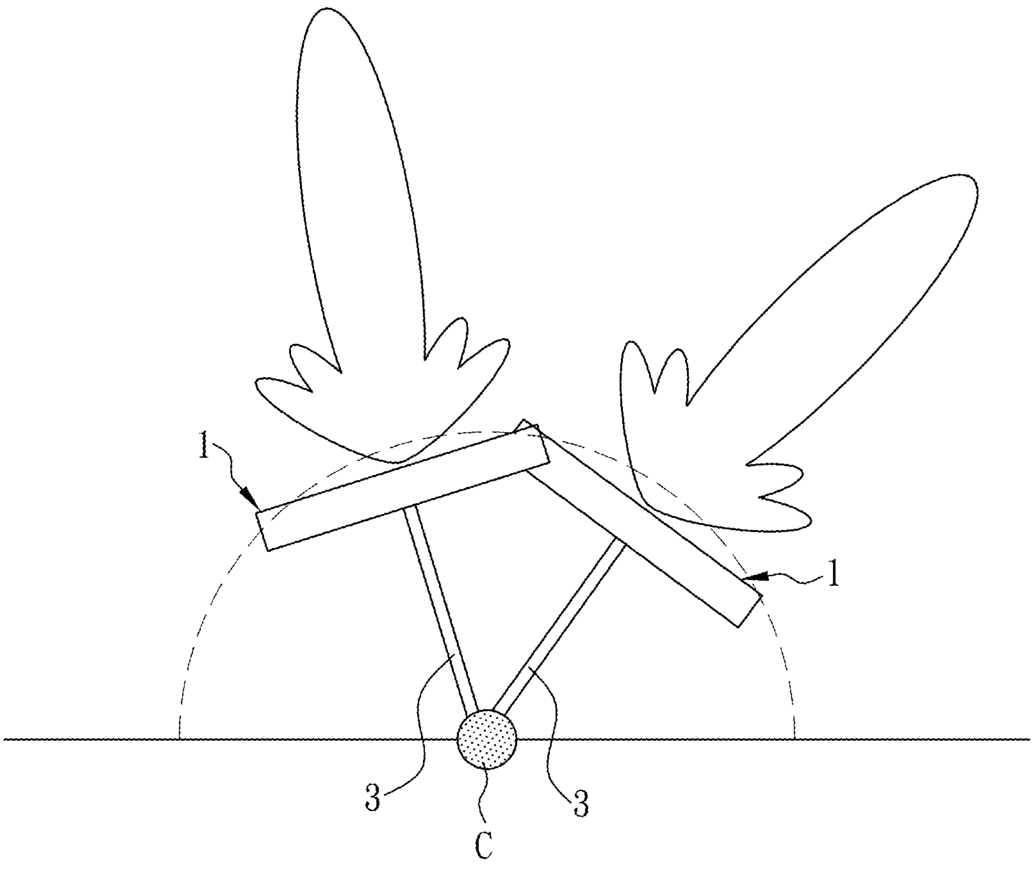
FIG. 14B is a schematic diagram showing each central support point being located behind the corresponding antenna module according to certain embodiments of the present disclosure.

As the antenna module 1-and-lens mechanism 5 combinations in certain foregoing embodiments are intended to achieve high-gain antenna structures, in certain embodiments, each antenna module 1-and-lens mechanism 5 combination can be replaced by a high-gain antenna. For example, referring to FIG. 13A and FIG. 13B, an antenna device A6 can dispense with the lens mechanisms 5, the two antenna modules 1 can be so configured that they are driven to swing by their respective swinging portions 3 and have substantially the same curved-path swinging mechanism and method as in certain embodiments described supra with the lens mechanisms 5, one of the two antenna modules 1 can be used to track and link to a satellite while the other antenna module 1 can wait for and searches for the next satellite to link to, and the antenna modules 1 hand over or switch their respective current operations to each other when they are adjacent to each other. In certain embodiments, the two antenna modules 1 can work in concert with each other to increase the gain of the antennas and thus be able to jointly track the same satellite. In certain embodiments, each central support point C is located forward of the corresponding antenna module 1, i.e., with each central support point C facing the radiation plane (i.e., the plane from which beams are radiated) of the corresponding antenna module 1. Accordingly, each central support point C will be located between the corresponding antenna module 1 and the satellite tracked therewith and tend to interfere with the radiation of the corresponding antenna module 1. In view of this, in certain embodiments, referring to FIG. 14A and FIG. 14B, each central support point C can be located behind the corresponding antenna module 1, i.e., with each central support point C facing away from the radiation plane (i.e., the plane from which beams are radiated) of the corresponding antenna module 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device with a swinging mechanism, comprising:

at least one antenna module configured to transmit at least one active radio-frequency (RF) signal outward and receive at least one external RF signal from the outside;

at least one active RF module electrically connected to the at least one antenna module and configured to control a phase and an amplitude of the at least one active RF signal transmitted from the at least one antenna module so that the at least one antenna module forms a focused radiation beam of the at least one active RF signal, and control a generation by the at least one antenna module of a radiation pattern for receiving the at least one external RF signal;

at least one swinging portion connected to the at least one antenna module and configured to swing the at least one antenna module along a circular arc around a center of circle defined by a central support point to supplement an ability of the at least one antenna module in scanning in a one-dimensional direction; and at least one lens mechanism, wherein an extension line of the central support point extends through a portion of the at least one lens mechanism, the at least one antenna module is configured to be swung along a circular arc around a periphery of the at least one lens mechanism, and the at least one lens mechanism is configured to receive the radiation beam transmitted from the at least one antenna module, generate a corresponding secondary beam, and emit the secondary beam from a side of the at least one lens mechanism that is opposite to the at least one antenna module.

2. The antenna device according to claim 1, further comprising a rotating portion connected to the at least one swinging portion and configured to drive the at least one swinging portion to rotate such that the at least one antenna module spins on or revolves around a vertical axis to supplement an ability of the at least one antenna module in scanning another dimensional direction, wherein the vertical axis crosses the extension line of the central support point.

3. The antenna device according to claim 2, wherein the rotating portion is configured to make the at least one antenna module rotate in a single direction that is clockwise or counterclockwise, or in alternating clockwise and counterclockwise directions.

4. The antenna device according to claim 1, wherein the central support point is located forward of the at least one antenna module and facing a radiation plane of the at least one antenna module.

5. The antenna device according to claim 1, wherein the central support point is located behind the at least one antenna module and facing away from a radiation plane of the at least one antenna module.

6. The antenna device according to claim 1, wherein the at least one lens mechanism has a substantially cylindrical shape.

7. The antenna device according to claim 1, wherein the at least one lens mechanism comprises a plurality of lens disks connected in series along an axial direction.

8. The antenna device according to claim 1, wherein the at least one lens mechanism has a substantially semicylindrical shape and a cut-off surface at one side of the at least one lens mechanism, and a swinging area of the at least one antenna module is substantially on a side of the at least one lens mechanism that faces away from the cut-off surface.

9. The antenna device according to claim 1, wherein the at least one lens mechanism has a substantially spherical shape.

10. The antenna device according to claim 1, wherein the at least one antenna module comprises two antenna modules, the at least one swinging portion comprises two swinging portions, each of the two antenna modules is configured to be swung by a corresponding one of the two swinging portions, and swinging directions of the two antenna modules are the same.

11. The antenna device according to claim 1, wherein the at least one antenna module comprises two antenna modules, the at least one swinging portion comprises two swinging portions, each of the two antenna modules is configured to be swung by a corresponding one of the two swinging portions, and swinging directions of the two antenna modules are opposite.

12. The antenna device according to claim 1, wherein a swinging angle of the at least one antenna module is between 0 and 90 degrees.

13. The antenna device according to claim 1, wherein the at least one antenna module comprises two antenna modules, and the antenna modules are arranged in a first axial direction and configured to be swung in a second axial direction.

14. The antenna device according to claim 1, wherein the at least one antenna module comprises two antenna modules, and the antenna modules are arranged in a first axial direction and configured to be swung in the first axial direction.

15. The antenna device according to claim 1, wherein each of the at least one antenna module comprises a plurality of antenna unit groups arranged in a first direction, each of the plurality of antenna unit groups comprises at least one antenna unit arranged in a second direction, each of the antenna unit groups is electrically connected to a corresponding one of the at least one active RF module, the corresponding active RF module is configured to control a phase and an amplitude of at least one RF signal corresponding to the antenna unit group.

16. The antenna device according to claim 15, wherein each of the at least one active RF module comprises:

a transmitting-end beam-forming integrated circuit (BFIC) configured to control the antenna unit groups to generate the focused radiation beam of the at least one active RF signal;

a power amplifier electrically connected to the transmitting-end BFIC and configured to receive the at least one active RF signal from the transmitting-end BFIC, amplify a power of the at least one active RF signal received from the transmitting-end BFIC, and directly or indirectly transmit the amplified at least one active RF signal to the antenna unit groups;

a receiving-end BFIC configured to control the generation by the antenna unit groups of the radiation pattern for receiving the at least one external RF signal; and a low-noise amplifier electrically connected to the receiving-end BFIC and configured to directly or indirectly receive the at least one external RF signal and amplify the at least one external RF signal.

17. An antenna device with a swinging mechanism, comprising:

at least one antenna module configured to transmit at least one active radio-frequency (RF) signal outward and receive at least one external RF signal from the outside;

at least one active RF module electrically connected to the at least one antenna module and configured to control a phase and an amplitude of the at least one active RF signal transmitted from the at least one antenna module so that the at least one antenna module forms a focused radiation beam of the at least one active RF signal, and control a generation by the at least one antenna module of a radiation pattern for receiving the at least one external RF signal; and at least one swinging portion connected to the at least one antenna module and configured to swing the at least one antenna module along a circular arc around a center of circle defined by a central support point to supplement an ability of the at least one antenna module in scanning in a one-dimensional direction, wherein the central support point is located forward of the at least one antenna module and facing a radiation plane of the at least one antenna module.

18. An antenna device with a swinging mechanism, comprising:

at least one antenna module configured to transmit at least one active radio-frequency (RF) signal outward and receive at least one external RF signal from the outside;

at least one active RF module electrically connected to the at least one antenna module and configured to control a phase and an amplitude of the at least one active RF signal transmitted from the at least one antenna module so that the at least one antenna module forms a focused radiation beam of the at least one active RF signal, and control a generation by the at least one antenna module of a radiation pattern for receiving the at least one external RF signal; and at least one swinging portion connected to the at least one antenna module and configured to swing the at least one antenna module along a circular arc around a center of circle defined by a central support point to supplement an ability of the at least one antenna module in scanning in a one-dimensional direction, wherein each of the at least one antenna module comprises a plurality of antenna unit groups arranged in a first direction, each of the plurality of antenna unit groups comprises at least one antenna unit arranged in a second direction, each of the antenna unit groups is electrically connected to a corresponding one of the at least one active RF module, the corresponding active RF module is configured to control a phase and an amplitude of at least one RF signal corresponding to the antenna unit group.

19. The antenna device according to claim 18, wherein each of the at least one active RF module comprises:

a transmitting-end beam-forming integrated circuit (BFIC) configured to control the antenna unit groups to generate the focused radiation beam of the at least one active RF signal;

a power amplifier electrically connected to the transmitting-end BFIC and configured to receive the at least one active RF signal from the transmitting-end BFIC, amplify a power of the at least one active RF signal received from the transmitting-end BFIC, and directly or indirectly transmit the amplified at least one active RF signal to the antenna unit groups;

a receiving-end BFIC configured to control the generation by the antenna unit groups of the radiation pattern for receiving the at least one external RF signal; and a low-noise amplifier electrically connected to the receiving-end BFIC and configured to directly or indirectly receive the at least one external RF signal and amplify the at least one external RF signal.

* * * * *